Figure 1:
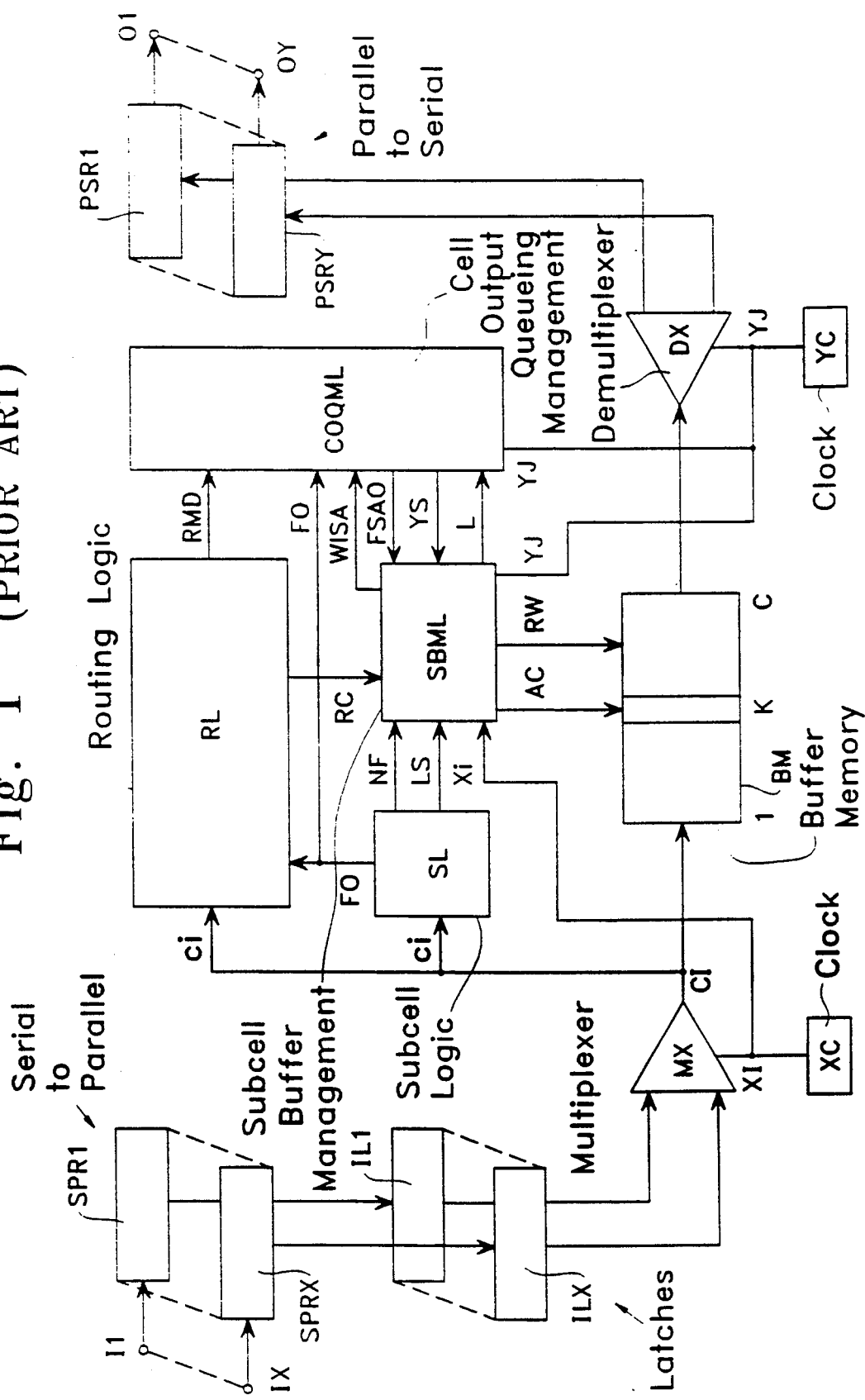

›
United States Patent [19]
Henrion et al.

[11] Patent Number: 5,237,565
[45] Date of Patent: Aug. 17, 1993

[54] MULTIPLE PATH, SELF-ROUTING SWITCHING NETWORK FOR SWITCHING ASYNCHRONOUS TIME DIVISION MULTIPLEX CELLS

[75] Inventors: Michel A. Henrion, Zaventem; Henri Verhille, Rommersheide, both of Belgium

[73] Assignee: Alcatel N.V., Amsterdam, Netherlands

[21] Appl. No.: 776,337
[22] PCT Filed: May 23, 1990
[86] PCT No.: PCT/FR90/00365
§ 371 Date: Dec. 13, 1991
§ 102(e) Date: Dec. 13, 1991
[87] PCT Pub. No.: WO91/14325
PCT Pub. Date: Sep. 19, 1991

[30] Foreign Application Priority Data

Mar. 14, 1990 [FR] France .............. 90 03246

[51] Int. Cl.$^5$ ............................................ H04L 12/56
[52] U.S. Cl. .................................. 370/60.1; 340/826
[58] Field of Search ............ 370/53, 54, 60, 60.1; 340/825.02, 826

[56] References Cited

U.S. PATENT DOCUMENTS

| | | | |
|---|---|---|---|
| 4,760,570 | 7/1988 | Acampora et al. | 370/60 |
| 5,032,837 | 7/1991 | Yoshifuji | 340/826 |

FOREIGN PATENT DOCUMENTS 8603355 6/1986 European Pat. Off. .
0229299 7/1987 European Pat. Off. .
0241152 10/1987 European Pat. Off. .

OTHER PUBLICATIONS

J. S. Turner, "Design of a Broadcast Packet Switching Network", *IEEE Trans. on Communications*, vol. 36 No. 6, Jun. 1988, pp. 734–743.
J. H. Degan, et al, "Fast Packet Technology for Future Switches", *AT&T Technical Journal*, vol. 68 No. 2, Mar. 1989, pp. 36–50.
Mund & Guibaly, "A 2×2 Switching Element for Broadband ISDN", *IEEE Pacific Rim Conference on Communications, Computers and Signal Processing (Victoria BC)*, Jun. 1989, pp. 620–623.

*Primary Examiner*—Benedict V. Safourek
*Attorney, Agent, or Firm*—Brunell & May

[57] ABSTRACT

A multiple path, self-routing switching network for switching asynchronous time division multiplex data cells includes input ports (pi1, pi64 . . . ), output ports (po1, po64 . . . ) and switching elements (TSi1, TSi16 . . . ) arranged in a number of stages of interconnected switching elements, each switching element having inlets and outlets and being constructed to transfer a data cell received at one of its inlets, to one or more of its outlets, according to routing data associated with said cells. Each switching element of at least one stage of the network has at least three outlets, arranged in groups of outlets of one or more determined outlets. Using routing data associated with a data cell received at any one of its inlets, the switching element (TSi1, TSi16 . . . ) identifies a set of one or more of said groups of outlets and to transfer said received cell to an outlet of each group of outlets of the selected set.

43 Claims, 10 Drawing Sheets

MULTIPLE PATH, SELF-ROUTING SWITCHING NETWORK FOR SWITCHING ASYNCHRONOUS TIME DIVISION MULTIPLEX CELLS

This invention relates to a multiple path, self-routing switching network for switching asynchronous time division multiplex cells.

A switching network, in its widest structural definition, comprises input ports to which are connected input connections, output ports to which are connected output connections, switching elements disposed between these input ports and these output ports, arranged in one or more stages and interconnected by links. The input ports of the switching network are associated with the inlets of switching elements of a first stage, while the output ports are associated with the outlets of switching elements of a last stage. The outlets of the switching elements of said first stage are connected by links, possibly by means of intermediate switching element stages, to the inlets of the switching elements of said last stage. The links generally comprise one or more independent connections, each connecting an outlet of a switching element to an inlet of another switching element or the same switching element.

Such a switching network is said to be a multiple path network when it offers more than one switchpath between any one input port and any one output port. In this case, identification of an input port and an output port is not sufficient to determine a path from one to the other. There is still a choice to be made between the multiple paths offered by the switching network between this input port and this output port.

Such a network is said to be self-routing, in the broadest sense of the term, when it is such that a switchpath is determined in a switching network not only by means of routing information containing the implicit or explicit identification of an input port and that of an output port of the switching network, but also by a routing decision specific to the switching network.

The self-routing facility introduced in the switching network thus provides an independent means for solving the routing problem posed by multiple path networks when the routing is defined only by identification of an input port and an output port.

Multiple path, connection-oriented, self-routing switching networks are well known in synchronous time division multiplex channel switching or circuit switching. In such networks, the connection setup or routing process is accomplished once, at the beginning of a call, and determines a switchpath the elements of which, initially free, are then occupied by the call, and therefore become unavailable for other calls. The switchpaths set up therefore cause a risk of blocking through a lack of channels when searching for a new switchpath. The switching process applied in these known switching networks generally encompasses all or a major part of the switching network. It is therefore complex and requires a relatively long time lapse, in terms of individual control operations to establish the connection. On the other hand, this time lapse is very short, compared with the duration of the call and is not therefore prejudicial to the communication efficiency of the switching network.

Cells, also called packets, are units of digital information comprising in particular a tag containing information for identifying the destination of the cell and call data.

Cells are of fixed length or variable length. In the latter case, the cell is transferred in the form of an uninterrupted sequence of a number of relatively small fixed length sub-cells enabling internal transfer, storage in memory or in registers and sub-cell processing functions to be optimised.

In an asynchronous time division multiplex cell transmission system, the cells of several calls, transmitted over the same connection, follow each other in any order and cells relative to a particular call are transmitted at irregular intervals.

Taking into account the characteristics of asynchronous time division multiplex cell transmission, an asynchronous time division multiplex cell switching network is generally a switching network constructed to switch such cells individually, in such a way that a switchpath is found for each of them, to route it from an input port of the network to at least one output port. In this case, a "cell-oriented" switching network enables a pathfinding and selection process to be performed for each individual cell. In addition, it is also commonly accepted that, in this type of network, it is advisable to make provision, not only for conventional routing, referred to as point-to-point, from one input port to one output port, but also at least point-to-multipoint routing, between one input port and a number of output ports.

However, a preliminary connection setup process, such as that just described for asynchronous time division multiplex channel or circuit switching networks, although it is in principle also applicable to asynchronous time division multiplex cell switching, nevertheless presents a number of disadvantages, such as complex management of the bit rates of connections set up over each internal link of the network and too long a time lapse for setting up data connections.

Multiple path, connection-oriented, self-routing switching networks known in synchronous time division multiplex channel switching or circuit switching do not therefore provide an optimum solution for asynchronous time division multiplex cell switching.

Those skilled in the art therefore turned to specific switching networks in which the switching process including pathfinding takes place stage by stage for each individual cell, therefore without preliminary setup and marking of a connection at the beginning of a call.

A description of an example of a switching network of this type will be found in the article "Design of a Broadcast Packet Network" by J. S. Turner, published in "Proceedings of IEEE INFOCOM '86", Fifth Annual Conference, "Computers and Communications Integration Design, Analysis, Management", pages 668 to 673.

Such a network comprises, from input ports to output ports, stages specialising in the replication of cells necessary for point-to-multipoint calls, stages specialising in the distribution of cells, to mix the cells from the different inlets and to obtain equal, stable average bit rates per link, as far as it is statistically possible, and stages specialising in selective routing to the output ports. This network is constructed using switching elements with two inlets and two outlets only. A small buffer memory for two cells is provided at each switching element inlet. When a cell must use an outlet which is not available, because another cell is already being forwarded over this outlet, the inlet can temporarily store the un-forwarded cell.

Such a network has disadvantages and limitations such as, in particular:
- a large number of stages when the number of input and output ports is high,
- limited efficiency through the storage of cells at inlets when outlets are busy,
- a certain difficulty in the implementation of extensions, due amongst other things to the large number of stages,
- the existence of cell replication stages, causing an additional cost,
- a certain sensitivity to the process of arrival of cells at each input port, which is not completely overcome by the use of distribution stages and which therefore affects the performance of the switching network, etc.

The object of this invention is an asynchronous, cell-oriented, self-routing, time division multiplex cell switching network not suffering, or at least suffering in only a much smaller measure, from the above-mentioned disadvantages and limitations.

The switching network of this invention is characterised in that:
- each switching element of at least of one stage of the network has at least three outlets,
- these outlets are arranged in groups of outlets called routing groups,
- a group of outlets comprises one or more determined outlets,
- on the basis of routing information associated with a fixed or variable length cell received at any one of its inlets, the switching element is constructed to identify a set comprising one or more of said outlet groups of outlets, a copy of the cell being transferred to each of the identified outlet groups,
- the switching element is constructed to transfer said received cell to a selected outlet of the outlets of the single group of said set, or one outlet per group of the outlets of said set, each selected from the outlets of the group to which it belongs.

This network therefore consists, in at least one of its stages, of switching elements which, through the establishment of groups of determined outlets, of which one outlet is selected each time, procure not only a selective routing, but also effect a distribution of the cells over the different outlets of a routing group. In addition, the possible routing to an outlet of each of several groups implements the replication of cells necessary in the case of point-to-multipoint routing. Thus, as will be seen, such a switching element lends itself to the implementation of integrated switching networks in which the specialisation of parts of the switching network disappears. The more outlets per group the switching element contains, the better the distribution, because the greater will be the number of paths offered to a cell, which also tends to reduce blocking through shortage of available outlets, or to increase the routing efficiency of the switching element and therefore the whole switching network. Similarly, the switching element is then less sensitive to the arrival process of the cells, since the cells from a particular inlet are routed by a multiplicity of different paths at each stage.

In a multistage switching network, it will be possible to arrange that the switching elements of at least two stages have the characteristics indicated; the arrangement of the outlets in groups is not then necessarily the same in each of these at least two stages and the switching elements of each of these stages are constructed for each to hold its own routing parameters derived from position information.

Such arrangements will enable the respective location of its switching elements in the switching network to be taken into account in the arrangement of their outlets in groups and in particular the fact that the arrangement of links between successive pairs of stages is not necessarily the same.

According to another characteristic of the invention, said routing information is interpreted in each stage to determine the mode of transferring a received cell to the outlets of the switching element and said interpretation is based on said routing parameters derived from the position of the switching element.

These arrangements enable the same type of switching element to be used in the different stages of a switching network and a single set of routing information to be employed in a cell and nevertheless different modes of transferring the cell to be used in the different stages of the switching network, which provides great flexibility in the use of different routing modes to transfer a cell across the switching network according to a variety of possible transfer sequences.

In a particularly advantageous application mode, the switching elements of at least certain stages of the network include means for interpreting routing information contained in a routing tag of a cell, which includes a routing control code (RCC) defining the required sequence for transferring the cell across the switching network, an output port address (RCA), for a point-to-point routing and/or a multicast tree internal reference number (IRN) for a point-to-multipoint routing.

The switching elements considered, interpreting said routing control code on the basis of said routing parameters derived from the position of the switching element are designed to select as a result a routing mode which can be, among others, a point-to-point routing or a point-to-multipoint routing.

The invention covers the case in which the switching elements of all stages are symmetrical, having the same number of inlets and outlets, and in which the switching network is consequently symmetrical, having the same number of input ports and output ports.

According to another characteristic of the invention, the switching elements of at least one stage can be asymmetric, each implementing an expansion of the traffic entering the stage, reducing the cell traffic load of the outlets of these switching elements with respect to their inlets.

Such arrangements can be used to reduce the load of the outlets of the switching elements and therefore the retention of the cells or their loss in the switching elements or the corresponding buffer memory requirements in these switching elements.

Conversely, the switching elements of at least one stage can be asymmetric, each implementing a concentration of traffic leaving the stage, increasing the cell traffic load of the outlets of these switching elements with respect to their inlets.

Each of these two types of use of asymmetric switching elements in at least one stage enable asymmetric switching networks to be constructed in which the number of input ports and output ports are different, in the first case to distribute the traffic over a greater number of output ports and in the second case to concentrate the traffic onto a smaller number of output ports.

In addition, stages which are asymmetric but in different directions can be combined in the same switching network. In particular, it is even possible to construct a symmetrical switching network having the same number of input ports and output ports in which at least one of the first stages is asymmetric and implements a traffic expansion and at least one of the last stages is asymmetric and implements a traffic concentration which compensates for the previous expansion. This then leads to a reduction in the traffic load on the internal links of the switching network between these two asymmetric stages with the advantages mentioned above.

Another object of the invention is a switching network in which the switching elements of at least certain stages route cells belonging to two opposing traffic streams, and in which, in each of these switching elements called bidirectional switching elements, the inlets are divided into two sets of inlets and the outlets into two sets of outlets, one traffic stream normally being routed from a first set of inlets to a first set of outlets and the other traffic stream from a second set of inlets to a second set of outlets; the interpretation of the routing information in the switching element also takes account of the traffic stream to which it relates to determine whether the routing should be "normal", that is to the associated set of outlets (same traffic stream) or "reflected", that is to the other set of outlets (opposite traffic stream).

The invention also extends however to the case in which the switching elements of all the stages of the switching network are unidirectional, routing cells belonging to a single traffic stream routed from the inlets of each of these switching elements to their outlets.

According to one embodiment of the invention, the switching network contains at least three unidirectional stages, each switching element of a stage other than the last being connected by one or more links to each switching element of the following stage and each switching element of one stage other than the first being connected by one or more links to each switching element of the preceding stage.

According to another embodiment of the invention, the switching network contains at least one inlet selection unit and at least one outlet selection unit, each formed of switching elements arranged in at least two stages and in each of which each switching element of a stage other than the last is connected by one or more links to each switching element of the following stage and each switching element of a stage other than the first is connected by one or more links to each switching element of the preceding stage, the inlet selection units being disposed in tandem with the outlet selection units, the input ports being connected to the inlets of the inlet selection units and the output ports to the outlets of the outlet selection units.

In this last embodiment, a single inlet selection unit can be connected directly to a single outlet selection unit, by cross connection between the outlets of the first and the inlets of the second.

In the case of several inlet and outlet selection units, according to the invention, the switching network can also include selection units called selection planes each connecting inlet connection unit outlets to outlet selection unit inlets.

According to another characteristic of the invention, in the switching elements of at least one stage, one of said groups of outlets of a switching element contains all the outlets of the switching element, in the case of a unidirectional switching element, or all the outlets of one of the two sets of outlets for a given transfer direction, in the case of a bidirectional switching element, for a general distribution of the incoming traffic over all the outlets of this stage in the incoming transfer direction.

According to another embodiment of the invention, the switching network is configured as an extensible folded network, having at least two stages at least one of which is bidirectional, the input ports being connected to the inlets of said first set of inlets of the switching elements of a first stage and the output ports being connected to the outlets of said second set of outlets of these same switching elements of the first stage, when this is bidirectional, the last stage being composed of unidirectional switching elements which route an incoming traffic stream to the switching elements of the preceding stage, thereby implementing a traffic reflection function.

When the first stage is not composed of bidirectional switching elements, but of two counterpart sets of unidirectional switching elements (one for each direction of transfer), the input ports are connected to the inlets of the incoming switching elements and the output ports to the outlets of the outgoing switching elements.

According to this last embodiment, the folded switching network comprises at least two stages at least one of which is bidirectional and each switching element of a stage other than the last is connected by one or more links to each switching element of the following stage and each switching element of a stage other than the first is connected by one or more links to each switching element of the preceding stage.

According to an alternative to this last embodiment, the folded switching network comprises at least three stages and at least the first two stages consist of inlet and outlet selection units each formed from switching elements arranged in at least two stages and in each of which each switching element of one stage other than the last is connected by one or more links to each switching element of the following stage and each switching element of one stage other than the first is connected by one or more links to each switching element of the preceding stage.

In this last case, to construct large capacity switching networks which can grow in terms of the number of stages, said inlet and outlet selection units can be interconnected by a number of selection units called folded selection planes, each comprising an arrangement of one or more stages according to the required capacity.

These different types of folded switching network having at least one bidirectional stage offer the advantageous property of being extensible in terms of the number of stages, according to the required capacity in terms of the number of network ports, without requiring alterations in the wiring between stages. Any bidirectional stage can temporarily form the last equipped stage of an intermediate configuration through its ability to "reflect" traffic from the incoming transfer direction to the outgoing transfer direction.

In the last embodiments envisaged, advantageously, the first stage or stages of the switching network effect a general distribution of the incoming traffic over the set of possible paths, that is over all the links, between these first stages, thereby implementing a distribution of the received cells over the input ports on a multiplicity of paths. In a unidirectional switching element of such a stage, the single routing group therefore comprises all the outlets of the switching element; in a bidirectional switching element of such a stage, the set of outlets in the incoming transfer direction forms the single routing group through which the incoming traffic is distributed. To implement such a distribution of incoming traffic, according to the invention, each cell must be capable of selecting any of the available outlets in such a distribution routing group.

Advantageously, then, the switching elements of one or more of the first stages of the switching network are constructed so that, when the routing data specifies a point-to-point transfer and/or a point-to-multipoint transfer, and taking into account said position data, the incoming traffic is evenly distributed in the first stage or stages.

Advantageously also, the selection of one of the outlets of a group is performed in a way which balances the cell load over the different outlets of this group.

Advantageously also, said selection performed in a way to balance the cell load over the different outlets of this group is based on a quasi or pseudo-random distribution process intended to achieve a decorrelation between the distribution of cells over the inlets and the distribution of cells over the outlets of the switching element.

The quasi or pseudo-random distribution is performed on selection of an outlet from the different outlets belonging to the selected routing group. This can take place before the identities of cells are stored in queues which are then individually assigned to the outlets. In addition, the two arrangements described above, load balancing and random distribution, can advantageously be combined.

Multiple path, self-routing switching networks according to the invention also present the following characteristics:

- The combined use of a multiplicity of paths to transfer the different cells of a call to the output port or ports concerned and switching elements storing the cells for an undefined time, results in these cells being routed to the output port or ports with a variable transfer time likely to alter the order of successive cells. This characteristic involves the introduction of circuits to re-establish the order of cells at each outlet port of the switching network.

- The distribution of incoming cell traffic over a multiplicity of possible paths in the first distribution stages leads to the characteristic property that the bit rate of internal connections of such switching networks is no longer dependent on the bit rate of the external transmission connections connected to it, or on the bit rate of services transmitted over these external connections. The principle of distribution by a multiplicity of paths within the network enables the incoming flow of cells from a high bit rate external connection to be distributed over several input ports of the lower bit rate switching network; for example, a 2.4 Gbit/s external connection can be connected to 16×150 Mbit/s input ports. After transfer of the cells in the switching network over all possible paths, the cells requiring an outgoing external connection at the same bit rate of 2.4 Gbit/s are routed to a group of 16×150 Mbit/s output ports in which the cell order is re-established and asynchronous multiplexing performed over the 2.4 Gbit/s outgoing connection.

Similar reasoning shows that a service which would require a cell bit rate equivalent to 200 Mbit/s can be transferred through the switching network over a multiplicity of paths, each corresponding to a 150 Mbit/s internal connection.

- The distribution of the incoming traffic in the first distribution stages also has the characteristic consequence of implementing an averaging of the load on the external connections over the switching elements of the internal stages of the switching network. It is then possible, for example, to equip a variable number of selection planes according to the average traffic load over all the external connections of the most heavily loaded selection unit in terms of traffic.

- With respect to point-to-multipoint transfers, according to predefined multicast trees, the multiplicity of possible paths to transfer a cell across the multiple path, self-routing switching network requires a characteristic organisation of the content of the multicast tree memories of the switching elements of the different stages. According to the invention, it is possible to define corresponding branch points so that no unnecessary copy is generated in any stage, which avoids internal overloading on the internal links between stages.

Figure 2:
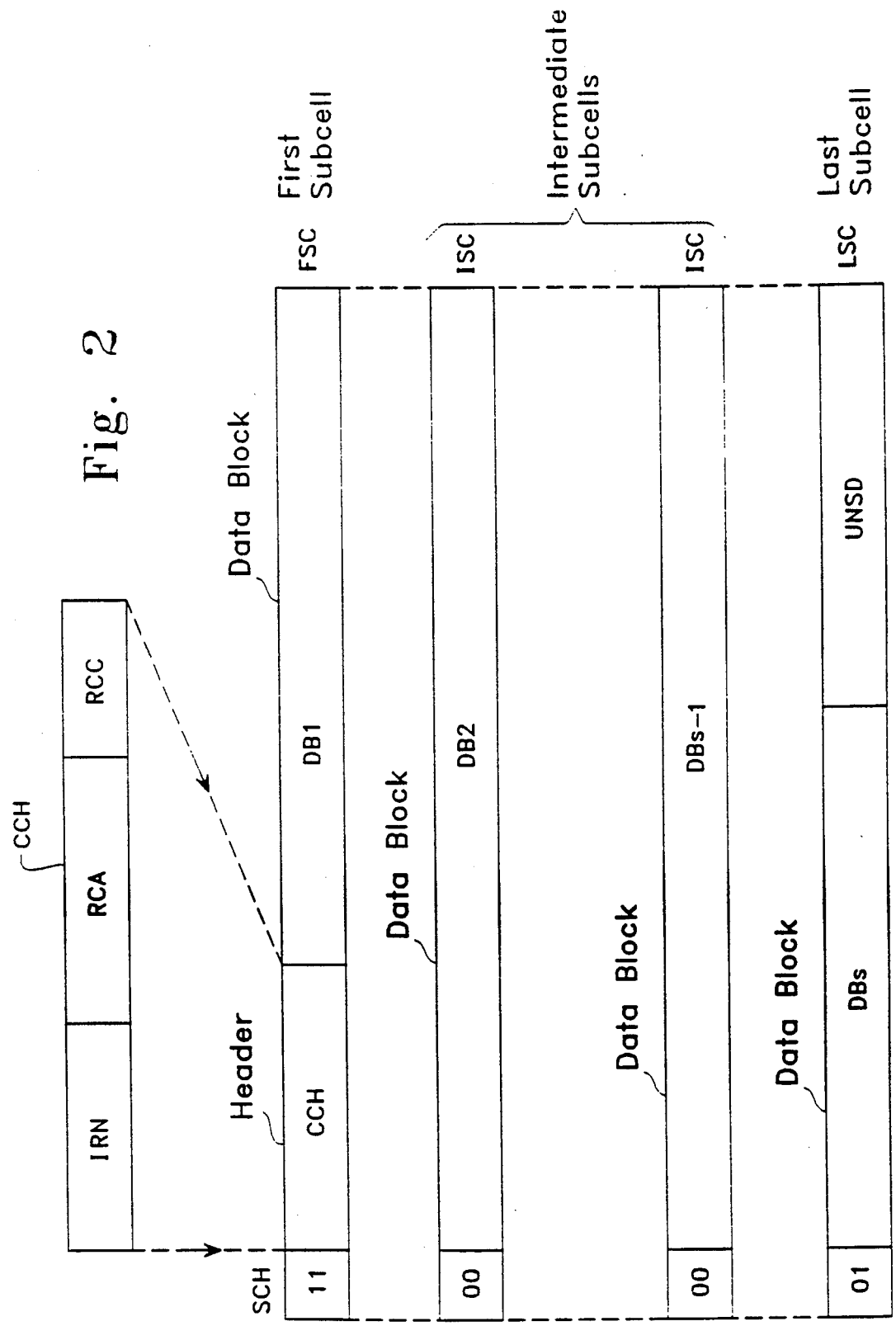
Figure 3:
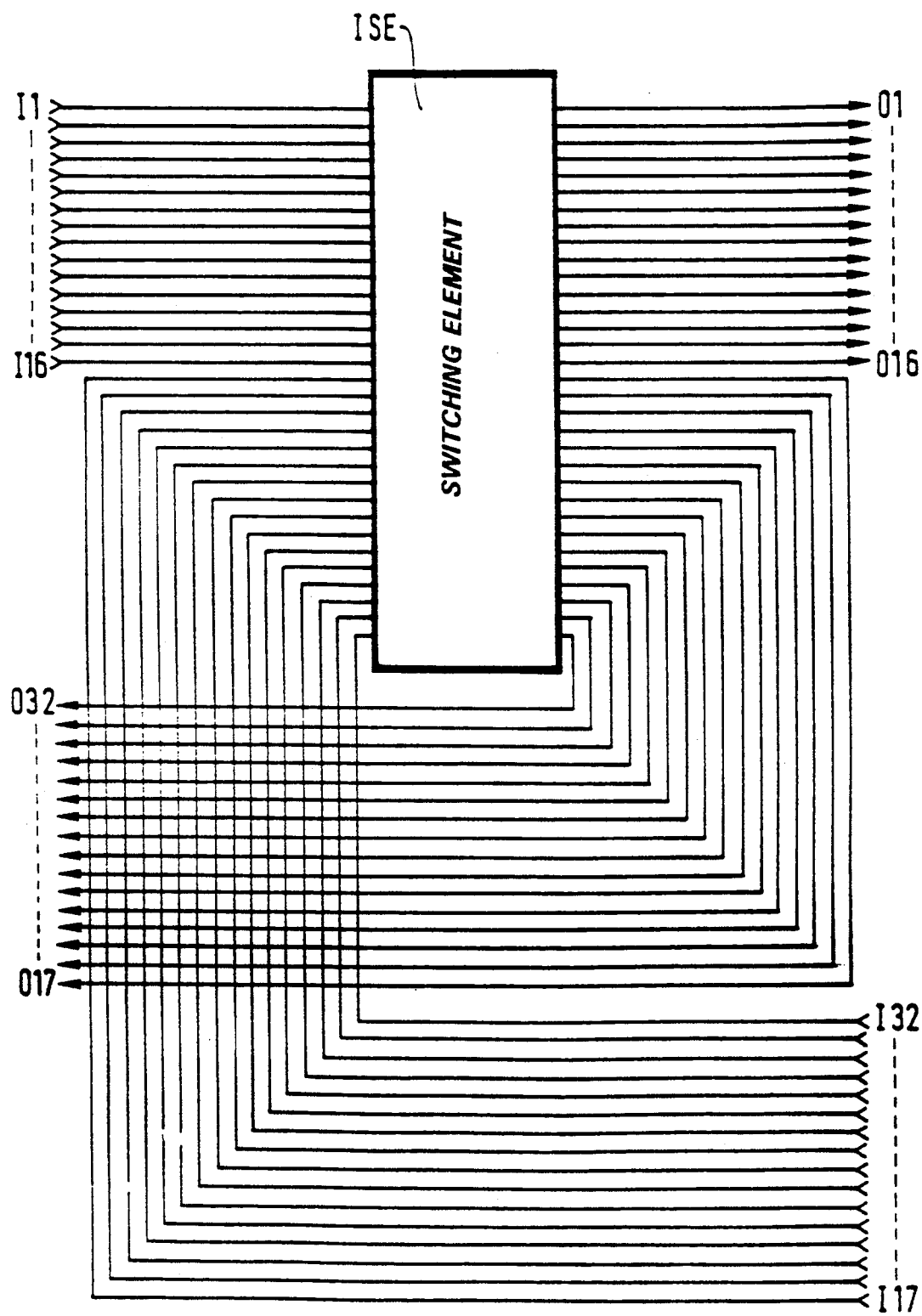
Figure 3A:
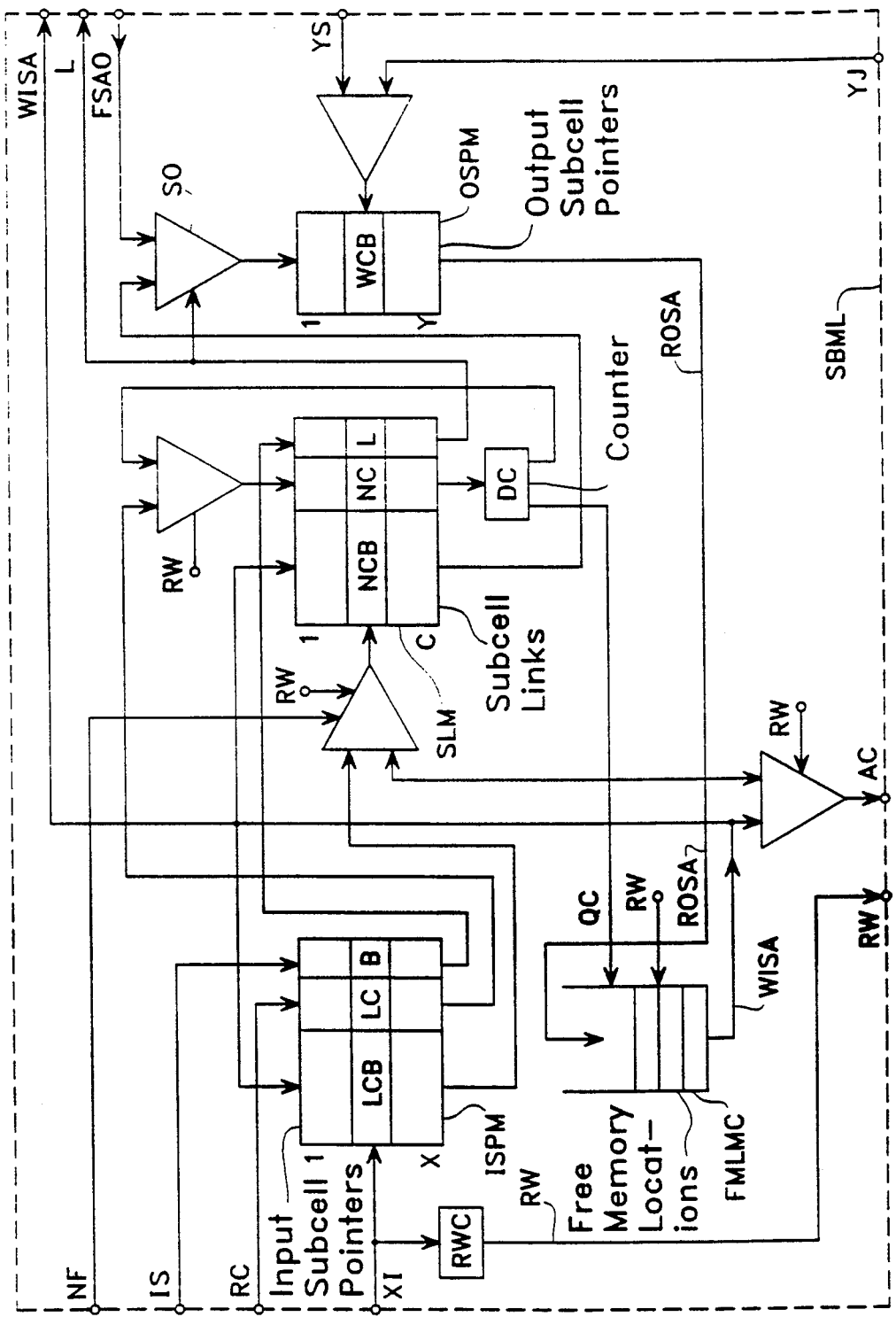
Figure 4:
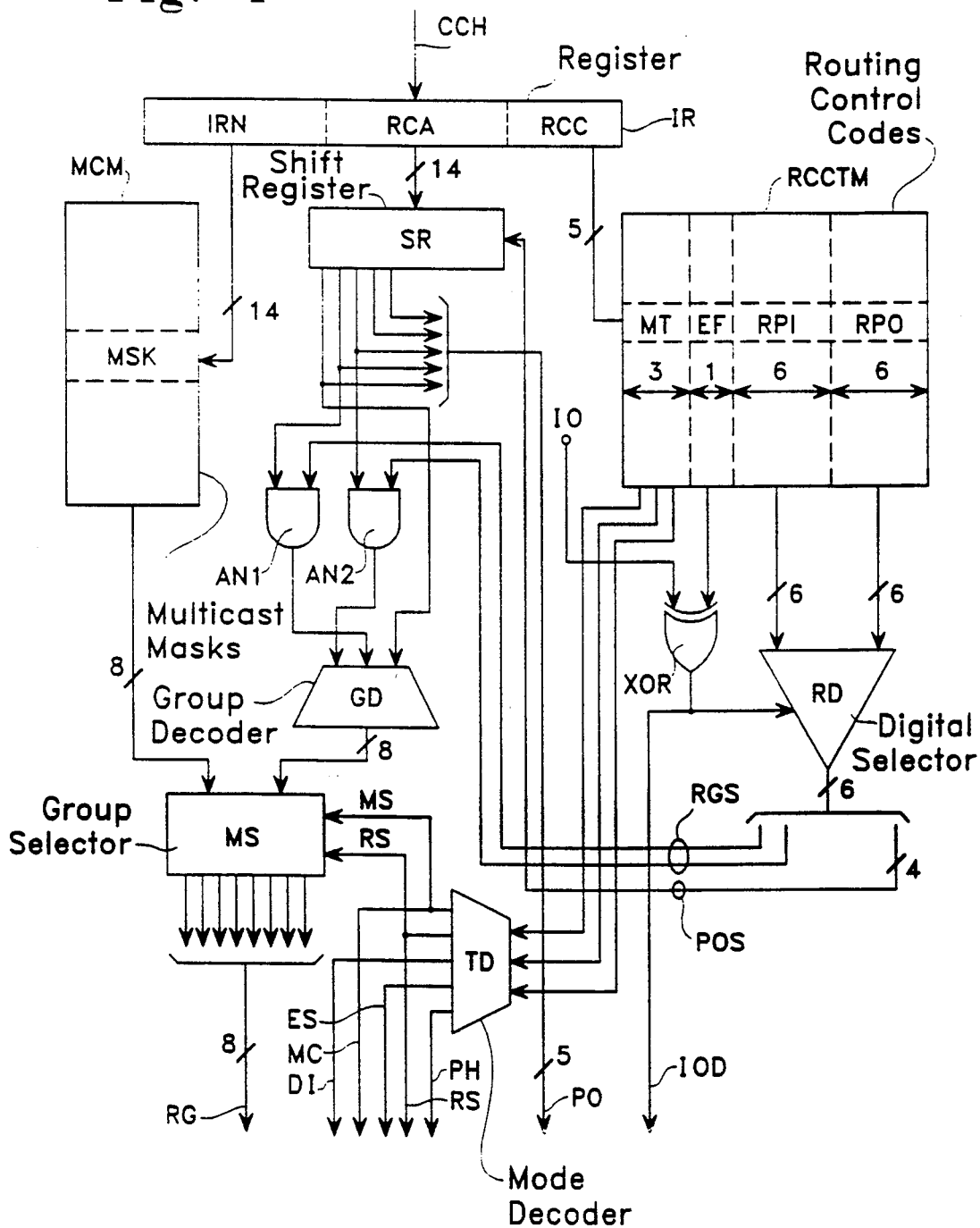
Figure 4A:
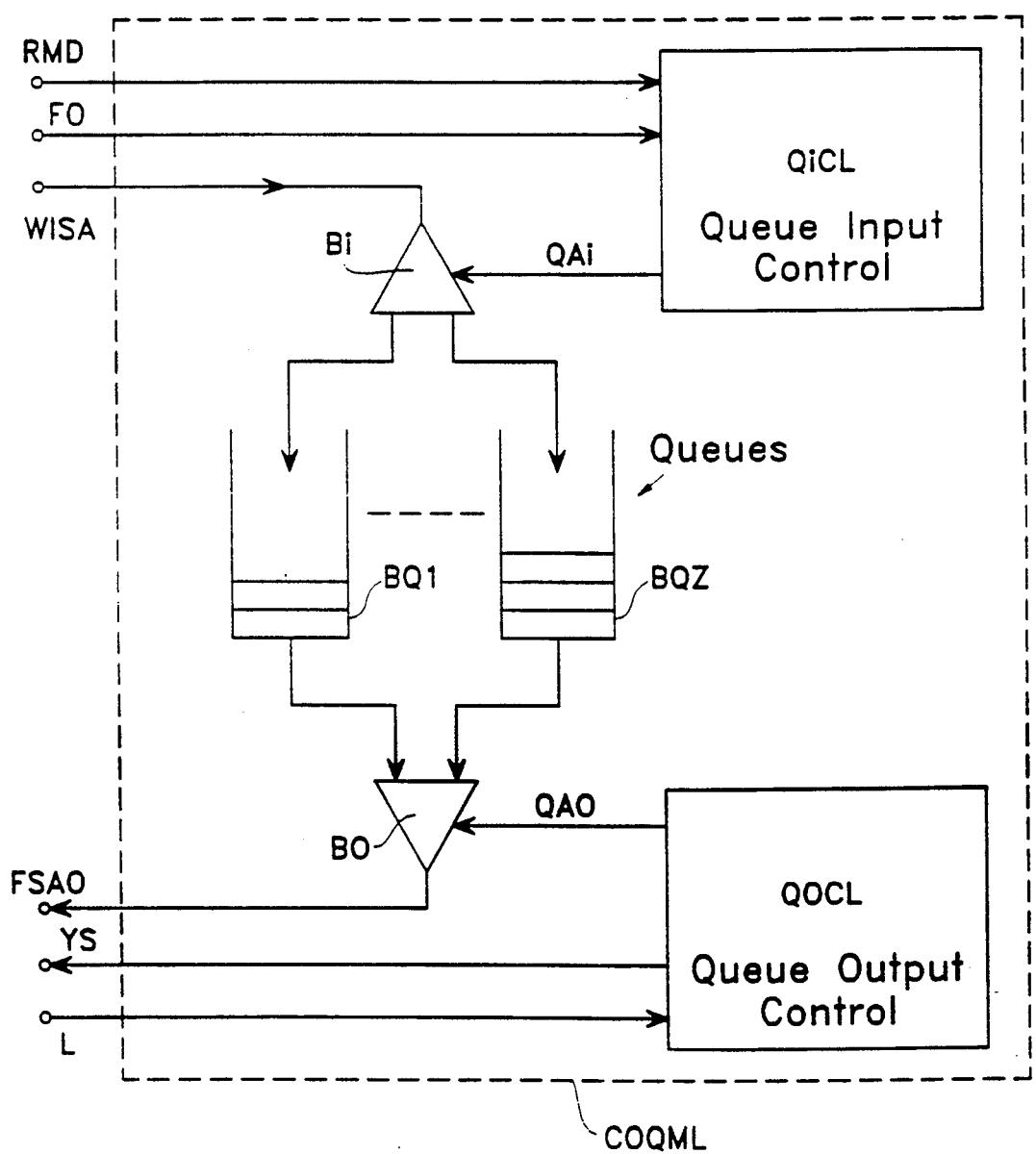
Figure 5:
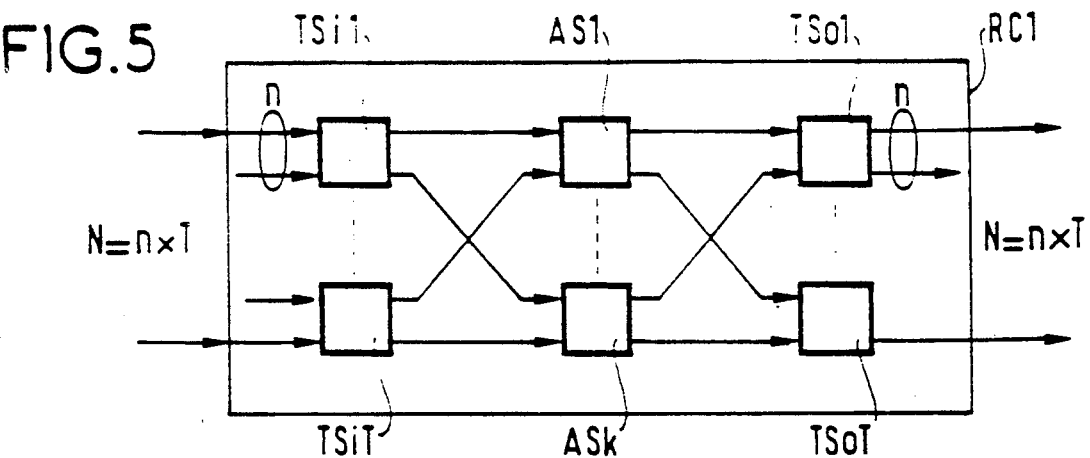
Figure 6:
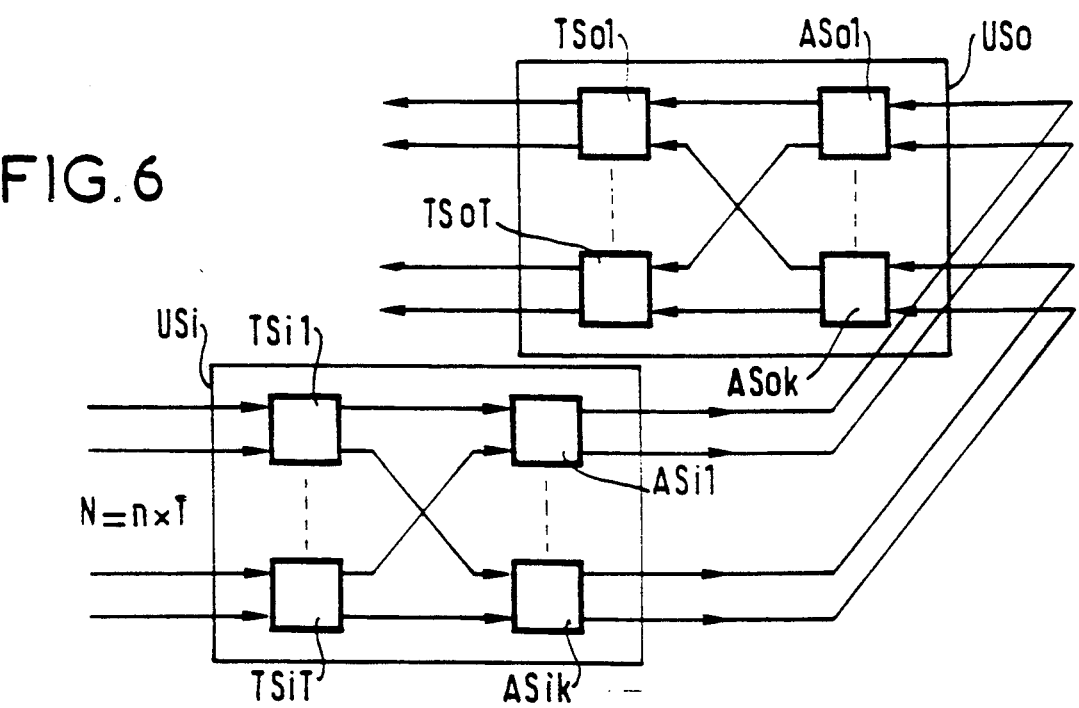
Figure 7:
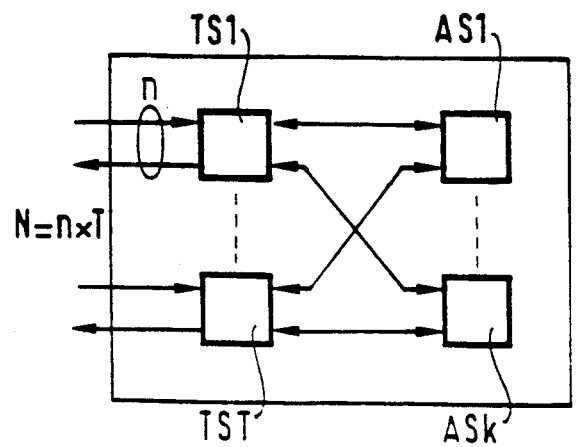
Figure 8:
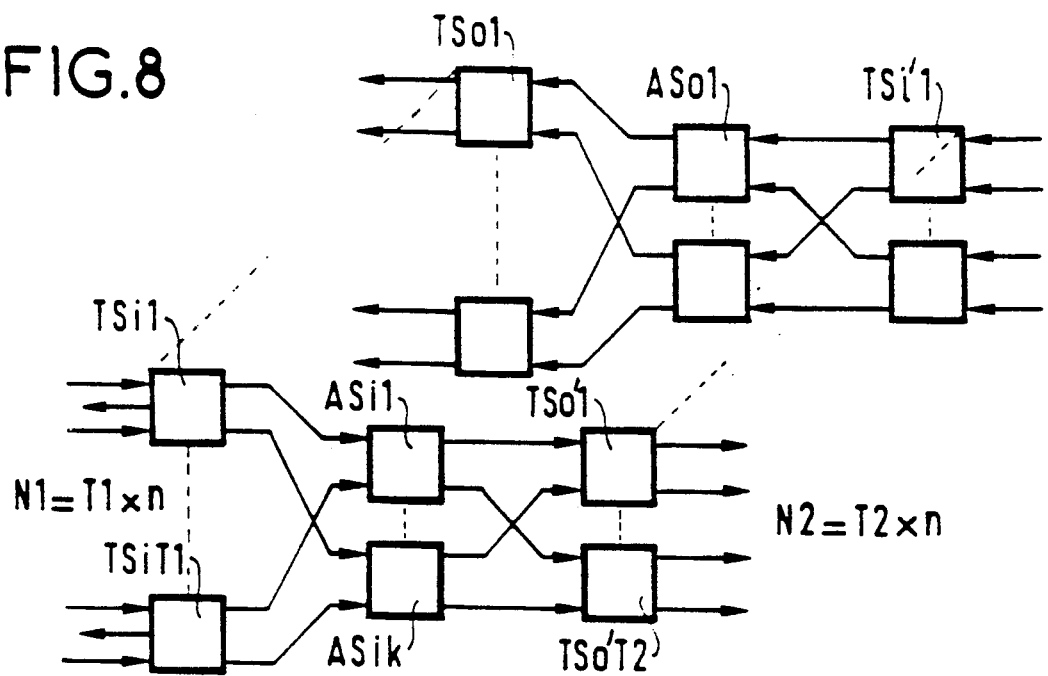
Figure 9:
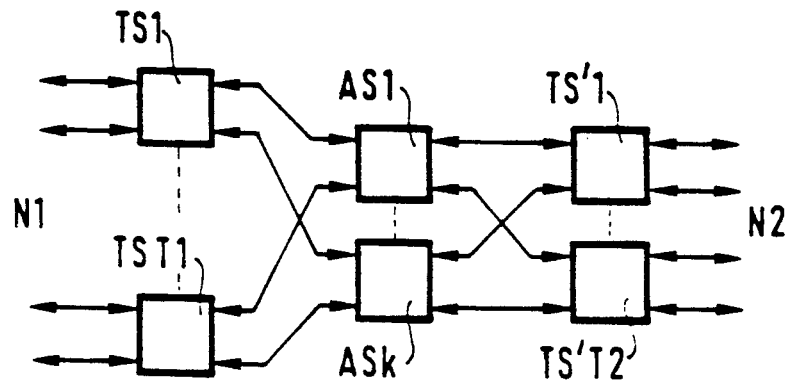
Figure 10:
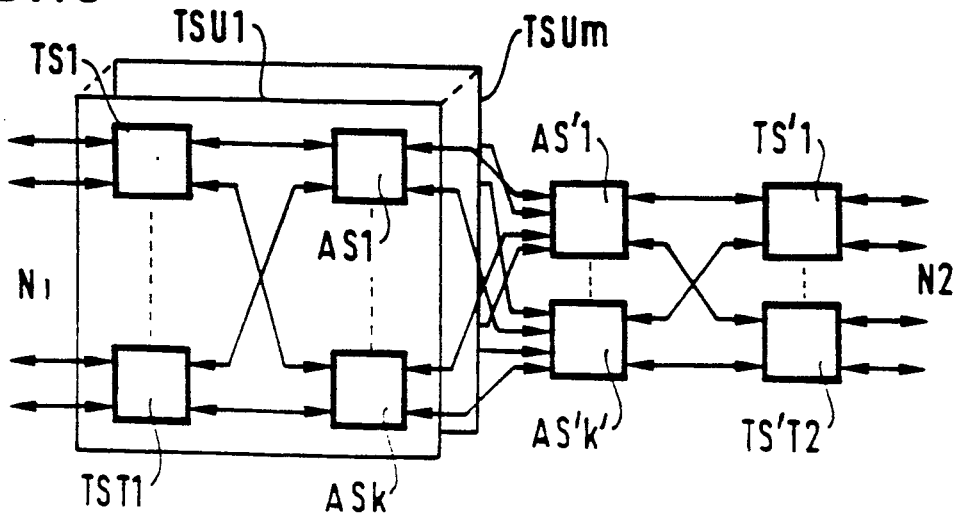
Figure 11:
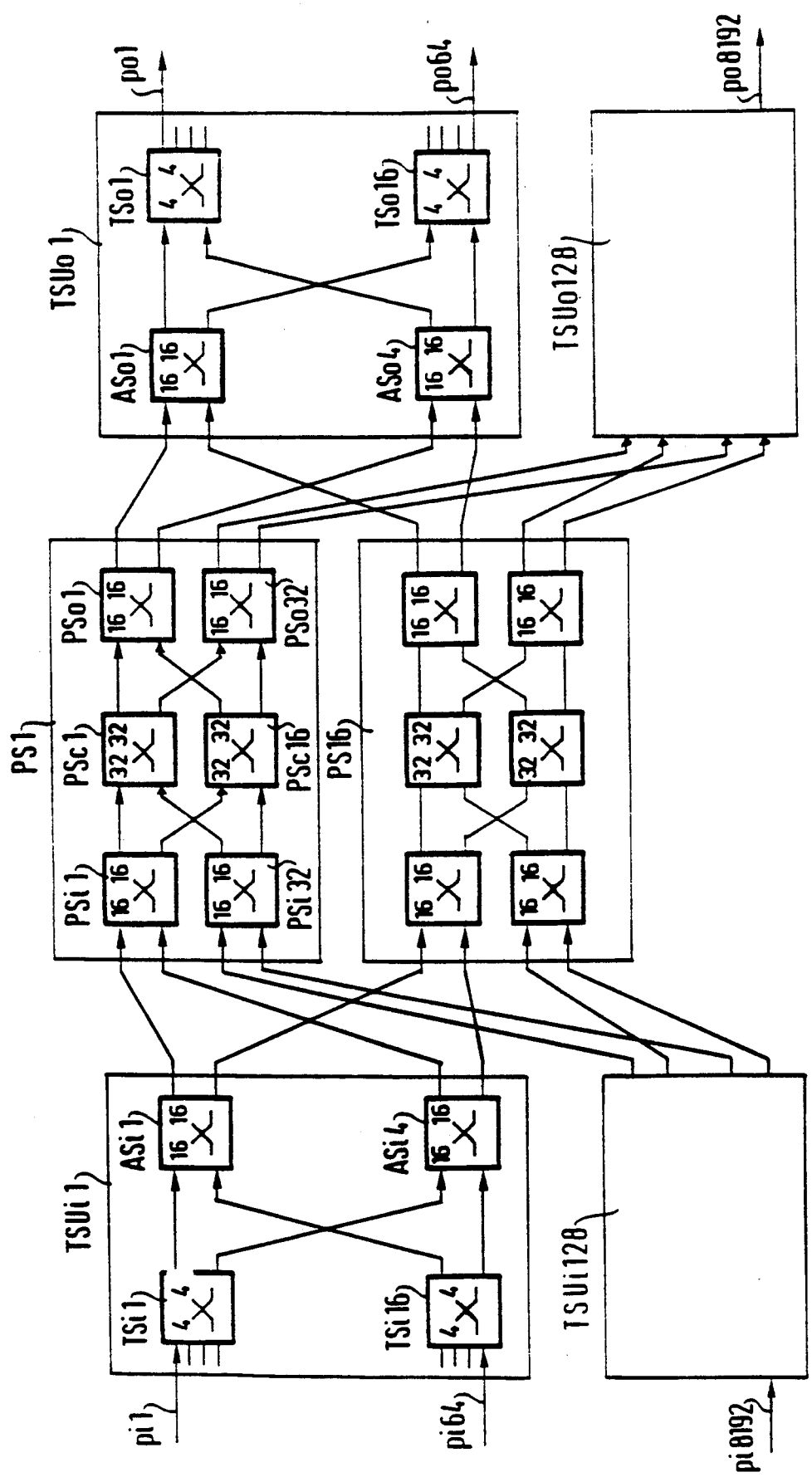
Figure 12:
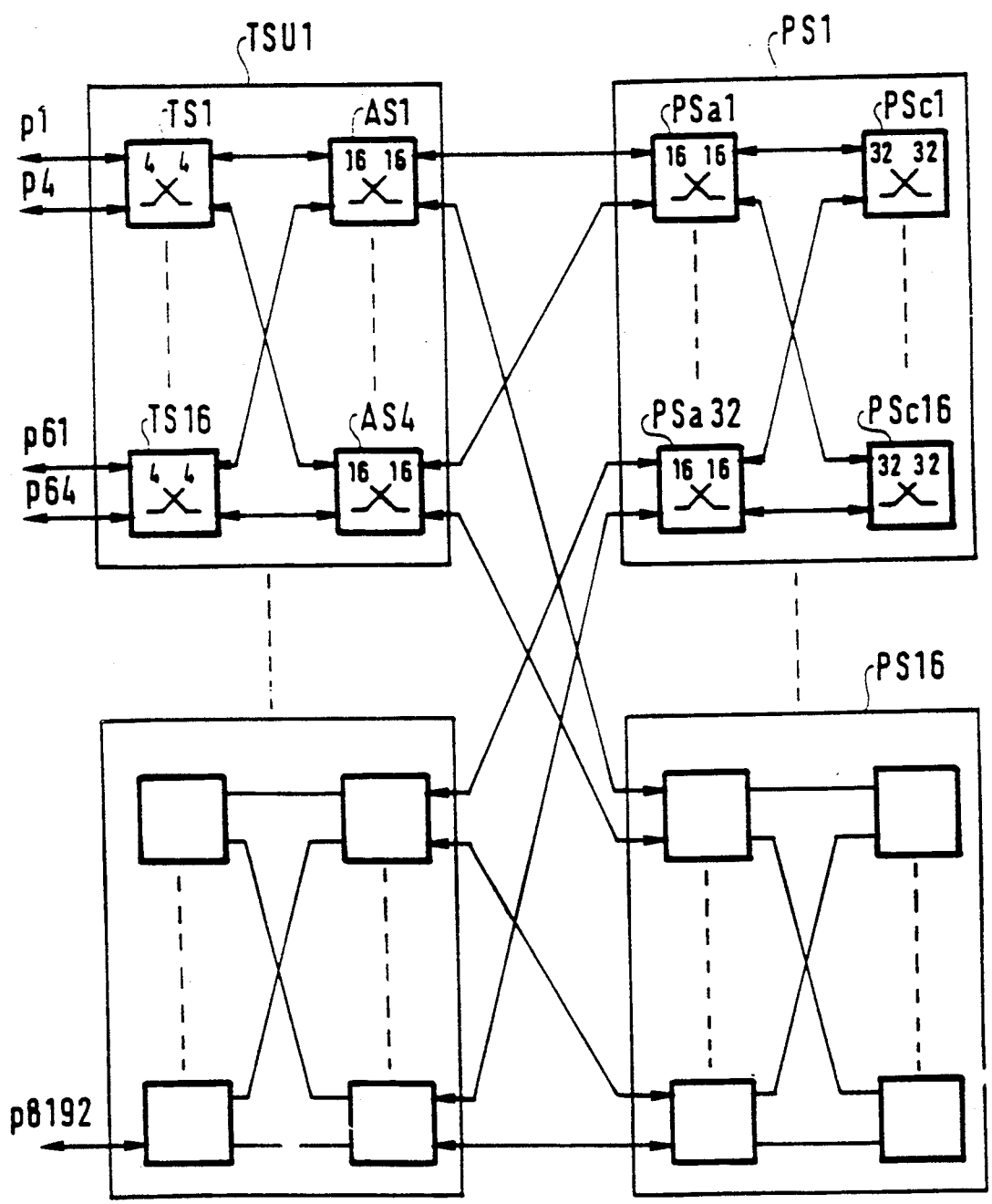

The above-mentioned and other objects and features of the invention will become more apparent and the invention itself will be best understood by referring to the following description of an embodiment taken in conjunction with the accompanying drawings wherein:

FIG. 1 is a known diagram of the circuit of a switching element ISE employed in the switching network of this invention, FIG. 2 represents the format of a cell, designed for the implementation of this invention, FIG. 3 is a diagram of a method of applying the switching element in FIG. 1, for routing cells in two opposite directions, FIG. 3b is a detailed diagram of the subcell buffer management logic SBML in FIG. 1, FIG. 4 is a diagram of the routing logic RL according to the invention, applicable in the switching element in FIG. 1, enabling it to be used in accordance with FIG. 3, FIG. 4b is a detailed diagram of the cell output queuing management logic COQML in FIG. 1, FIG. 5 is a symmetrical unidirectional switching network according to the invention, FIG. 6 is a four-stage symmetrical unidirectional switching network arranged as two back-to-back selection units each having two stages, FIG. 7 is a folded symmetrical switching network corresponding to that in FIG. 6, FIG. 8 is an asymmetric unidirectional switching network with two times three stages, FIG. 9 is a three stage asymmetric bidirectional switching network corresponding to the preceding network, FIG. 10 is an asymmetric bidirectional switching network with a number of two-stage selection units, FIG. 11 is a symmetrical unidirectional switching network with a number of two-stage selection units interconnected by a number of three-stage selection planes, and FIG. 12 is a folded symmetrical switching network corresponding to that in FIG. 11.

In the figures, to simplify matters, various connections are represented as single wires, although they can incorporate a plurality of such wires. In addition, the figures do not represent all the control circuits, their implementation obviously being derived, for those skilled in the art, from the content of the description.

The switching element represented in FIG. 1 with X inlets I1/IX and Y outlets O1/OY (X and Y not being equal to 1 at the same time) is constructed to switch digital signals grouped in cells or packets of fixed or variable length. Such a cell, represented in FIG. 2, is for example constructed from a series of successive subcells, comprising a first subcell FSC, an intermediate subcell ISC and a last subcell LSC, all equal in length, for example 162 bits, or 2 bits and 20 eight bit characters. Each of these subcells contains a subcell control header SCH and a data block DB1 - DBs, the first subcell FSC containing in addition a cell control header CCH which, for example, contains routing information enabling the switching element to determine to which group(s) of outlets RG1/RGY all the successive subcells belonging to the same cell must be successively transferred, this transfer taking place on the same outlet or outlets. In this description, the subcell control header SCH is assumed to have an explicit binary value 11, 00 or 01 indicating that the subcell is respectively the first subcell FSC, an intermediate subcell ISC or the last subcell LSC of the cell.

The cell control header CCH itself contains three parts, a routing control code RCC, a destination indication in the form of a network output address RCA and a multicast tree internal reference number IRN.

The routing control code RCC, which can comprise five bits, contains routing mode data denoting a point-to-point routing mode or a broadcast or multicast routing mode, or any other required routing mode, certain of which will be explained subsequently. If, for a switching element, the routing control code RCC denotes the point-to-point routing mode, analysis of the network output address RCA identifies the selected group of outlets. If the routing control code RCC denotes the broadcast or multicast routing mode, the multicast tree internal reference number IRN is used to read a memory which provides the identities of the groups of outlets corresponding to the branch to be performed for this tree in the switching element.

The network output address RCA which will comprise up to 14 bits, for example, is the identity of the output port of the switching network (or a group of output ports) to which the received cell is to be addressed. When selective routing is performed by more than one stage of the switching network only part of this destination data is required in each of the switching elements to route the cell.

The internal reference number IRN which will also comprise for example 14 bits, is a number used in the switching network to identify the multicast tree according to which an incoming cell is to be transferred to a certain number of given output ports. It is interesting to note that according to the invention, a multicast tree in a self-routing, multiple path network is not a point-to-multipoint connection, because, being independent of the input port, it is characterised only by the set of destination output ports; in addition, in such a multiple path network, it corresponds to a multiplicity of potential point-to-multipoint paths between the set of input ports and the set of destination output ports of the multicast tree in question. In fact, a given multicast tree internal reference number IRN is not necessarily specific to a single call, but may be used by all the calls from any input ports needing to transfer each cell to the set of destination output ports of this multicast tree.

FIG. 3 now represents, for reasons of drafting convenience, a method of using the switching element ISE in FIG. 1 in the case of bidirectional routing, with a reflection facility, which will be explained subsequently with reference to FIGS. 7, 9, 10 and 12.

The switching element ISE, in the example in question, comprises 32 inlets I1 to I32 and 32 outlets O1 to O32. The inlets I1 to I32 are divided into two sets of inlets I1 to I16 and I17 to I32. The outlets are divided into two sets of outlets O1 to O16 and O17 to O32. Internally, other than in the reflection situation, the switching element is constructed to provide for normal left to right routing from inlets I1 to I16 to outlets O1 to O16, and, in parallel, but from right to left because of the external wiring method, inlets I17 to I32 to outlets O17 to O32. In the reflection situation, the switching element provides for the routing of inlets I1 to I16 to outlets O17 to O32, or inlets I17 to I32 to outlets O1 to O16. In such a switching element, the assignment of the inlets to the routing directions is predetermined. It may be indicated by a bit IO attached to each inlet and which indicates whether it belongs to an "incoming" direction (I1 to I16, for example, routing traffic normally intended for the set of outlets O1 to O16) or the opposite "outgoing" direction (I17 to I32, in the same example, routing traffic normally intended for the set of outlets O17 to O32.

The set of 16 outlets in each direction can be, for example, divided into a maximum of eight groups of at least two outlets and the routing of any cell to the outlets of one of the groups simply requires identification, by an 8-bit word (one bit per group) of the group or groups to which the cell is to be forwarded, it being understood that the cell is forwarded over a single outlet of each group thus identified.

Referring to FIG. 1, inlets I1/IX of the switching element represented therein are connected to the respective data inputs of a multiplex circuit MX through the intermediary of the cascade connection of respective serial/parallel converter circuits SPR1/SPRX and respective latches IL1/ILX. The data output CI of multiplexer MX is coupled to the data input, also CI, of a subcell buffer RAM BM, while the selection input XI of the multiplexer MX is controlled by an input clock circuit XC capable of connecting successively each of the X inputs of the multiplexer to the output of multiplexer CI, during a subcell period. Such a subcell period is the time interval in which a subcell is received in a serial/parallel converter circuit SPR1/SPRX.

The buffer memory BM is totally shared and its data output is connected to the data input of a demultiplexer DX the Y data outputs of which are coupled to respective outlets O1/OY through the intermediary of respective parallel/serial converter circuits PSR1/PSRY. The selection input YJ of demultiplexer DX is controlled by an output clock circuit YC capable of connecting successively the input of the multiplexer to the Y demultiplexer outputs during a subcell period.

Note that, for subcells having a length of 162 bits and for the same bit rate of 50 Mbit/s at the inputs and outputs, a subcell period is equal to:

$$162/50 = 3.24 \ \mu m.$$

More precisely, when, for example, the switching element has X=32 inlets and Y=32 outlets, 32 write operations and 32 read operations, or 64 operations, must be performed in the buffer memory BM during a single operations must be performed in:

$3.24/64 = 50.62$ ns.

In addition, when for example $X=16$ and $Y=32$, 48 operations must be performed during the same subcell period. This means that each of these operations must be performed in:

$3.24/48 = 67.50$ ns.

The buffer memory BM is divided into C, 512 for example, subcell buffer memory locations, each capable of storing one subcell, for example of 162 bits; it has an address input AC, and a read/write selection input RW, respectively coupled to the outputs of the same names of a subcell buffer management logic SBML.

The switching element also comprises a subcell logic SL and a routing logic RL, which are both coupled to the data output CI of the multiplexer MX.

The subcell logic SL is mainly a detector designed to detect and verify the subcell control header SCH of each subcell and to provide active output signals LS, FO or NF, according to whether the subcell is respectively the last subcell LSC, a first subcell FSC or is not a first subcell.

The routing logic RL analyses the routing information in the cell control header CCH of each first subcell FSC of a cell and provides active output signals RMD and RC, according to the routing information. More particularly, signal RMD provides the identity of one or more selected groups of outlets over which the subcells of the cell are to be transferred while signal RC indicates the number of the selected outlet groups, i.e. one for a point-to-point transfer and a value higher than one for a point-to-multipoint transfer. The type of routing information and the corresponding analysis process performed by the routing logic RL to generate output signals RMD and RC depends on the routing mode employed for the cell. The cell control header CCH can, for example, contain Y bits of routing information, each of these bits corresponding to a group of outlets over which the cell is to be transferred. The output cell queue management logic COQML shown in detail in FIG. 4b is simultaneously performs cell queue management and outlet selection functions, by storing the first write-in subcell address WISA in an appropriate queue BQ1/BQZ, according to the routing mode and data RMD supplied by the routing logic RL, and by transmitting the first read-out subcell address FSAO to the logic SBML, at the same time as the identity of the selected outlet YS.

The subcell buffer management logic SBML is coupled to the previously mentioned outputs LS, NF of the logic SL, RC of the logic RL, XI of the input clock circuit XC, FSAO of the cell output queueing management logic COQML, and YJ of the output clock circuit YC. It manages the use of the locations of the buffer memory BM, by providing the addresses of free locations, rendering them busy when they are in use and releasing them when they are no longer in use. Under the control of signals applied to its inputs, it also controls, via the read/write selection signal RW, read and write operations in the buffer memory BM at the same time forming linked lists linking the subcell buffer addresses of a particular cell. This is necessary because the subcells of a particular cell are stored in uncorrelated locations of the buffer memory BM, whereas they must be routed over the same selected outlet or outlets O1-/OY, in the same order, without interruption, as they arrived at one of the inlets I1/IX.

There now follows a brief description of the operation of the switching element in question. When a subcell of a variable length cell, such as represented in FIG. 2, appears at one of the inlets I1/IX, I1 for example, of the switching element, it is received by the corresponding serial/parallel converter circuit SPR1. Supplied by this converter circuit SPR1, the parallel version of the subcell is transferred to the corresponding interlock circuit IL1, through which it is sent to the multiplexer MX. Under the control of the clock signal XI provided at the input of the same name by the input clock circuit XC, the subcell, at a certain moment, corresponding to this inlet I1, is sent to the data input CI of the buffer memory BM, and to the subcell logic SL and the routing logic RL. It is then determined whether the subcell is a first subcell FSC, a last subcell LSC, or is not a first subcell, and for which group or groups of outlets RG1/RGY this subcell—and following subcells belonging to the same cell—must be respectively transferred. The resulting output signals LS, NF and RC are applied to the subcell buffer management logic SBML and the output signal RMD to the cell output queueing management logic COQML.

Under the control of clock signal XI, the logic SBML provides the address of a free buffer location, WISA for example, to the address input AC of the buffer memory BM, in consequence of which the subcell present at the data input CI of the buffer memory BM is stored in the memory location having the address WISA. This address WISA is rendered busy and is added to the linked list of addresses of all subcells already received from the same cell (in this case the signals NF, LS, RC and RMD are used). In this list, the addresses are in the same order as that of the subcells of the cell.

During a read operation, under the control of clock signal YJ provided at the input of the same name by the output clock circuit YC, the address of a subcell, ROSA for example, is provided at the address input AC of the buffer memory BM and the subcell in the corresponding memory location is read and transferred to the data output of the buffer memory BM. From there, it is sent, through the intermediary of the demultiplexer DX to the outlet or one of the outlets initially indicated by signal YS of the cell output queueing management logic COQML.

Refer now to FIG. 3b is, which represents the subcell buffer management logic SBML in FIG. 1 in greater detail.

As already stated, this subcell buffer management logic has inputs LS, NF, RC,XI, YJ, FSAO and YS, and outputs AC, L, RW and FSAI. It comprises a free memory location management circuit FMLMC, a subcell link memory SLM, an input subcell pointer memory ISPM and an output subcell pointer memory OSPM.

The FMLMC circuit of the SBML logic consists of a free location queue memory FQ which is, for example, a FIFO memory storing the addresses of all the free locations of the buffer memory BM. The FMLMC circuit has an input ROSA, an output WISA and control terminals QC and RW.

The subcell link memory SLM comprises C memory locations corresponding to the C buffer memory locations of the subcell buffer memory BM and stores, for each of them:
- the link address to the next subcell (NCB),

- the number of subcell copies which must be read (NC),
- a flag indicating the last subcell of the cell (L).

The subcell link memory field SLM is associated with a downcounter DC, such that the value NC is decremented by unity each time the memory SLM is read; then, the new value is stored instead of the previous value. Clearly, when the new value reaches zero, all subcell copies have been read and the downcounter DC generates a signal QC used to store the address of the subcell read (ROSA), which becomes free, in the free memory location management circuit FMLMC.

The input subcell pointer memory has X locations corresponding to the X inlets and it operates in synchronism with the input clock signals XI defining the time division multiplex operation of the X inlets. For each inlet, it stores:
- the buffer address of the last subcell received (LCB),
- the number of subcell copies which must be read later (LC),
- a flag indicating the last subcell of the cell (B).

The output subcell pointer memory has Y locations corresponding to the YK outlets and it operates in synchronism with the output clock signals YJ defining the time division multiplex operation of the Y outlets. For each inlet, it stores the address of the location of the next cell waiting to be transmitted to the outlet in question (WCB).

The write control circuit provides the various circuits with the appropriate control signals corresponding to alternate operation of the SBML circuits associated with the alternate read and write operations in the buffer memory BM, as a result of the interleaved clock signals relating to the inlets (XI) and the outlets (YJ). In accordance with this, the resulting signal RW is active during each write operation in the buffer memory BM, for the write-in of a subcell, and inactive during a read operation of the buffer memory BM for the read-out of a subcell.

The following description characterises the operation accomplished by these subcell buffer management logic functions during a write or read phase and for each of the three types of subcell of a cell: first subcell FSC, intermediate subcell ISC and last subcell LSC.

Consider first the write phase in the buffer memory BM, in the case of a first subcell FSC. In such a case, the signal FO is provided and the management logic SBML receives from the SL logic and the RL logic:
- NF=0, to indicate a first subcell,
- LS=0 to indicate that it is not a last subcell,
- RC=2, assuming for example the case of a point-to-multipoint transfer over two groups of outlets.

The signal RW being active, a write-in subcell address is provided by the management circuit FMLMC, which is the selected free buffer location in which the received subcell is stored. The address WISA is also stored in the input subcell pointer memory ISPM for the inlet XI, in order to store it as the last subcell address received, with a view to the next cycle relating to the same inlet. In addition, the address WISA is also provided to the COQML logic which stores it as a reference identity of this new received cell, because this cell receives the signal FO with the value 1.

With respect to the subcell link memory SLM, because it is a first subcell FSC (NF=0), the address WISA is not stored in the NCB field, since this new subcell does not need to be linked with the last subcell of the previous cell. In addition, the other data fields are used for this previous subcell by selecting its address which is supplied by the LCB field of the input subcell pointer memory ISPM and by storing LC and B from the input subcell pointer memory ISPM in fields NC and L of the sublink memory SLM respectively. The control signals RC and LS are stored respectively in fields LC and B of the ISPM memory for inlet XI.

In the case of an intermediate subcell, the signal FO is inactive and the subcell buffer management logic SBML receives from the subcell logic SL and the routing logic RL the signals:
- NF=1,
- LS=0,
- the RC signal is not used with NF=1.

As before, signal RW is active and another address WISA is supplied by the management circuit FMLMC, the memory location address which is used:
- to address the buffer memory BM and write in it the intermediate subcell ISC,
- to be stored in the LCB field of the ISPM pointer memory as the newly received last subcell address of the cell,
- to be stored in the NCB field of the SLM memory addressed by the content of the LCB field of the ISPM memory, in order to write in it that this new address WISA is the address of the next subcell linked with the previous subcell which is in fact the selected memory location in the SLM memory.

Simultaneously, the data of fields LC and B of the ISPM memory are transferred into fields NC and L of the SLM memory, before B is replaced in the ISPM memory with a new value from signal LS.

In the case of a last subcell LSC, signal FO is inactive and the subcell buffer management logic receives from the subcell logic SL and routing logic RL:
- NF=1,
- LS=1,
- while RC is not used since NF=1.

Again signal RW is active and another address WISA is provided by the FMLMC circuit and the corresponding buffer location address is used in the buffer memory BM, and the ISPM and SLM memories exactly as in the previous case of storing an intermediate subcell ISC.

Simultaneously, the values LC and B of the ISPM memory are transferred into fields NC and L of the SLM memory before B is replaced in the ISPM memory by the new value from signal LS, consequently indicating that, now, the last subcell of a cell has just been received.

However, as emphasised in the description relating to the storing of a first subcell SFC, during the next cycle relative to inlet XI, the values LC and B=1 will be transferred into fields NC and L of the SLM memory at the address of the previous cell (the last) provided by the LCB field of the ISPM memory.

Consider now the read phase of the buffer memory BM during which signal RW is inactive. Consideration will first be given particularly to the case of reading a first subcell FSC.

It must be assumed that, when the first subcell is sent, the content WCB of the output subcell pointer memory OSPM of the outlet considered YX has been initialised with the address of the first subcell of the cell to be transmitted. This will appear further on, when the last subcell of the cell is read.

The output subcell pointer memory OSPM then provides the address of the output subcell to be read which is used:

- to address the buffer memory BM for reading the corresponding first subcell FSC,
- selecting the SLM memory in read mode, which provides:
  - an indication NCB which is transferred to the OSPM memory to be stored as a new address WBC, with a view to the next cycle relating to outlet YJ,
  - an indication NC which is decremented by unity and re-stored as a new indication NC if it is other than zero; if the value zero is obtained, which means that the required number of read-outs of this subcell (providing the required number of copies of it) has been performed, the DC circuit generates a signal QC enabling the FMLMC circuit to record that the read-out subcell address ROSA buffer memory location can be released and included in the set of free buffer locations;
- a value L which is zero since it is not the last cell and initiates the previously mentioned transfer of the value NCB from the SLM memory to the WCB field of the OSPM memory, via the multiplexer SO.

In the case of an intermediate cell ISC, the same operations take place in the OSPM and SLM memories and in the FMLMC circuit as for reading a first subcell FSC.

In the case of a last subcell LSC, the OSPM memory again provides the ROSA address of the subcell to be sent, a last subcell LSC in the present case, which is used:
- to address the buffer memory BM for reading the last subcell,
- selecting the SLM memory in read mode, which provides:
  - a value NC which is decremented and treated exactly as in the other subcell read situations,
  - a value L, now equal to one, indicating that a last subcell LSC is present, which in this particular case prevents the transfer of the value NCB from the SLM memory to the WCB location of the OSPM memory, since there is no link to a subsequent subcell provided by the value NCB of the SLM memory in the case of a last subcell LSC; instead, L=1 is provided to the COQML logic to indicate that the outlet in question YZ is available for sending a subsequent cell, in the next cycle, since a last subcell of a cell is currently being transmitted.

Then, after selection by the COQML logic of the appropriate cell which is to be transmitted to the outlet YJ in question, the COQML logic initialises the value WBC in the OSPM memory in respect of outlet YJ, by writing in it the buffer location address of the first subcell FSAO of the next cell selected, before the next cycle concerning outlet YJ. Because this initialisation process is not implemented during the clock period YJ of the last subcell LSC, an asynchronous access to the OSPM memory is used, by means of the output address YS provided by the COQML logic.

While this embodiment of the subcell buffer management logic SBML has been described to illustrate the subcell buffer management principles employed for the transfer of cells consisting of subcells between any inlet and any outlet or outlets of the switching element, other embodiments of the functions of this management logic SBML, for example with respect to the free memory location management circuit FMLMC, are also included in types of switching element in accordance with this invention.

FIG. 4 represents an embodiment of the routing logic RL constructed for use in the switching element ISE in FIG. 1, and also providing for bidirectional operation as illustrated in FIG. 3.

The circuits in FIG. 4 receive, in a register IR, the cell control header CCH mentioned in FIG. 1, and output the information marking the control connection RMD which provides to the cell management and outlet selection logic the information specifying the selected routing mode (RS, MC, DI, ES, PH), and the routing data (RG, PO).

The routing mode information is as follows:
- a "group" mode signal RS, which is present when the cell is to be forwarded to one of the outlets of a group of outlets, in the case of point-to-point routing,
- a "multicast" mode signal MC, which is present when the cell is to be routed to one of the outlets of each of several groups of outlets, in the case of point-to-multipoint routing,
- a "distribution" mode signal DI, which is present when the cell is to be forwarded to one of the outlets of a set of outlets in the sense explained with reference to FIG. 3, in the case of a bidirectional switching element, or to one of all the outlets of the switching element, in the case of a unidirectional switching element, thereby implementing a general distribution, to achieve an even distribution of the cells received by the switching network,
- a "service" mode signal ES, which indicates that the cell received is intended for a particular control outlet,
- a "directed transfer" mode signal PH which indicates that the cell is to be forwarded to a predetermined outlet, for test reasons, for example.

The routing data of the RMD connection comprises:
- group identity signals GL which identify the group or groups to an outlet of which the received cell is to be forwarded, for routing modes RS and MC,
- individual output identity signals PO used with routing mode PH.

The circuits in FIG. 4 also receive, according to the inlet on which a received cell arrived, an incoming direction indication IO which is for example provided by the receiving circuit supplying the cell in question, on the input multiplexer in FIG. 1, specifying the incoming direction concerned, in the sense mentioned with reference to FIG. 3.

The circuits in FIG. 4 comprise the following components:
- the register IR already mentioned, to receive the cell control header CCH of each cell received, which comprises, as indicated, the information RCC, RCA and IRN,
- a routing control code translation memory RCCTM, storing 32 words of 16 bits, called routing parameters, each comprising a 3-bit routing mode code MT, a reflection flag or bit EF, a 6-bit "incoming" routing group field RPI and a 6-bit "outgoing" routing group field RPO,
- a multicast memory MCM, storing a plurality of 8-bit mask words MSK, one bit for each group of outlets, each identifying the different routing groups to which a copy is to be sent,
- a routing mode decoder TD, decoding the routing mode code MT and consequently providing one of the five mode signals mentioned previously,
- a direction selector RD, selecting either the "incoming" routing group field RPI or the "outgoing" routing group field RPO of the routing control translation memory RCCTM, according to the reflection flag EF and the incoming direction flag IO,

- an outlet group selector MS having two parallel 8-bit inputs, which provides the group identity signals RG, also of 8 bits, each bit corresponding to a separate group from the eight possible routing groups,
- a 14-bit shift register SR having a five conductor output PO; if the routing method is the "physical" method PH, this output identifies the outlet to which the received cell is to be routed,
- a routing group decoder GD,
- an exclusive OR-gate XOR, and
- two AND-gates, AN1 and AN2.

The routing logic circuits in FIG. 4 operate as described below, when the header of a received cell is present on the input multiplexer (FIG. 1) the cell control header CCH of which is sent to the register IR, while the IO bit indicates the incoming routing direction. As indicated above, a clock times the operation of the circuits appropriately in accordance with the current state of the art.

The routing control code RCC, characteristic of a transfer sequence across the switching network, does not directly indicate the routing mode to be applied to the switching element in question. This routing mode depends on the type of switching network and the position of the switching element in the network.

The routing control code, to be interpreted, is used as a read address in the routing control code translation memory RCCTM, for the routing parameters comprising the components MT, EF, RPI and RPO defined above.

The routing method code RT is decoded by the routing method decoder TD which consequently provides one of the mode signals RS, MC, ES, DI or PH.

The incoming direction flag IO is applied to one of the inputs of the exclusive OR-gate XOR while the reflection flag EF is applied to its other input. The output of the XOR gate provides the control signal of the outgoing direction selector RD. The outgoing direction selector selects either the "incoming" routing group field RPI or the "outgoing" routing group field RPO, specifying, for each set of outlets, a specific part of the destination address RCA which is to provide the identity of a routing group to one of the outlets of which the received cell is to be forwarded. Each of these fields include a 4-bit position flag POS and a 2-bit dimension flag RGS. The position flag POS controls the shift register SR so that the RCA information is shifted in it and part of the three bits that it contains come into the three lefthand stages, on the figure, of this register SR, or part of the five bits it contains come into the five lefthand stages, on the figure, of the register SR. The dimension flag RGS indicates how many of the three bits mentioned first must be used to define the identity of a routing group. Thus, the lefthand bit of these three bits is transmitted directly from the shift register SR to the group number decoder GD, the next bit is transmitted by the AND-gate AN1 controlled by one of the RGS signals and a third bit by the AND-gate AN2 controlled by the other RGS signal. The group number decoder GD provides an 8-bit word which forms the identity of a routing group, applied to the selector MS. In this word, only one bit is at one, for example, all the others being at 0. Simultaneously, the 14-bit multicast tree internal reference number IRN is applied by register IR to the multicast memory MCM, where it serves as the address for reading an 8-bit mask word MSK. As indicated before, this mask word identifies one or more routing groups in an 8-bit word, one or more of which are at 1, and the others at 0. It, too, is applied to the selector MS.

If the mode signal provided by the decoder TD is the "group" mode signal RS, selector MS provides at its output a group identity signal RG which is the signal provided by the decoder GD; in the case of the "multicast" mode signal MC, signal RG transmitted by selector MS is the signal MSK.

In addition, the five lefthand stages of the shift register SR, after the shift generated by the position flag POS, directly provide the identity PO of an outlet to which the received cell is to be forwarded, in the case of the "physical" routing mode PH.

In the particular case of the "distribution" mode DI, no group of outlets needs to be identified, since there is only one group comprising all the outlets of the set in question in the transfer direction in question.

In the case of the "service" mode ES, the outlet in question is known directly, since the received cell is to be transmitted to a particular control outlet represented in FIG. 1.

It can therefore be seen that the information in the routing control code translation memory RCCTM defines, in each switching element, the interpretation that this switching element must make of the 32 possible transfer sequences denoted by the routing control code RCC to determine the routing mode to be applied according to the routing data in the received cell header. This is equivalent to combining the routing information from a cell, unchanged while the cell passes through the switching elements of different stages of the switching network, with the routing parameters of the switching element, derived from its position in the network, for example specific to each stage and leading to a particular routing mode in each stage and for each routing sequence.

The information in the routing control code translation memory RCCTM is semi-permanent and can be written when each switching element is brought into service. However, the information in the multicast memory MCM must be modified during operation, to establish each multicast tree.

FIG. 4b is represents the general diagram of the cell output queueing management logic COQML in FIG. 1.

When the decision to route a new received cell to an inlet of the switching element is taken by the routing logic RL, the routing logic provides the COQML logic with the routing mode information and the associated routing data over the control connection RMD, this being confirmed by the control signal FO received from the SL circuit, which indicates the presence of a first subcell FSC containing the information for routing the cell being received. In addition, simultaneously, the subcell memory management logic SBML provides the COQML logic with the address WISA in the buffer memory BM, in which this first subcell FSC has been stored.

When an outlet YJ of the switching element transmits the last subcell LSC of a cell and is therefore going to become available to transmit another cell, the subcell memory management logic SBML indicates a next cell request by means of signal L then active, as explained previously, in the description of the SBML logic. Then, the COQML logic selects the next cell to be transmitted to this outlet, by providing the SBML logic with the address FSAO of the first subcell of the cell to be transmitted to outlet YJ, this last indication being notified by the outlet address YS also supplied by the COQML logic to the SBML logic, in order to be able to perform this operation outside the synchronous clock time YJ relating to the outlet YJ.

The cell output queueing management logic COQML comprises the following circuits:
- queues BQ1/BQZ the respective inputs of which come from a demultiplexer BI and the respective outputs of which are linked to a multiplexer BO, and which provide the temporary storage for the identities of cells awaiting output, on a first in/first out basis, said identities being characterised for example by the addresses of the first subcell of each cell in the buffer memory,
- a queue input control logic QICL which receives the requests to queue cells,
- a queue output control logic which selects each next cell to be transmitted to one of the outlets of the switching element as soon as it becomes available.

In addition to managing the temporary wait of cells to be transmitted, by storing their identities in queues, the COQML logic also controls selection of an individual outlet in each selected routing group, given that for the point-to-point RS, point-to-multipoint MC and distribution DI routing modes, the routing logic RL identifies only the routing groups to which a copy of the cell is to be transmitted, or all the outlets in a direction in the DI mode.

In a first embodiment, this individual outlet selection function is performed by a queue input control logic QICL, before the identity of the cell is queued. In this case, each queue BQ1/BQZ is directly associated with each of the Y outlets of the switching element.

Another equivalent embodiment consists in the same outlet selection function being performed by the queue output control logic QOCL, therefore after the identity of the cell has been queued. In this second case, each queue BQ1/BQZ is associated with a routing group comprising one or more outlets and not with an individual outlet of the switching element.

In either embodiment, the outlet selection device needed for routing modes RS, MC and DI can be implemented in a known manner on the basis of a cyclic distribution of cells to the outlets of a particular routing group, enabling the cell traffic load of the routing group to be evenly distributed over each of its outlets. Another proposed solution is to use a quasi or pseudo-random signal generator to select an outlet for each cell, which leads to the elimination, at least in large part, of any correlation between the flow of cells over the inlets and the outlets of each switching element.

In the case of the ES or PH modes, an outlet of the switching element is respectively implicit or already selected and the role of the COQML logic is limited to the function of management of these queued cells for each corresponding individual outlet.

There now follows, with reference to FIGS. 5 to 12, a number of embodiments of the switching network according to the invention, based on FIGS. 1 to 4, with respect to the specific characteristics of the switching elements employed in the different stages of the switching network.

The properties of a switching network come from the properties of the switching elements forming the network, as they are constructed, according to the invention through the semi-permanent routing parameters derived from the position of the switching elements and the configuration of the switching network, essentially consisting of the number of stages, the unidirectional or bidirectional nature of each stage, the links between the switching elements and the input and output port connection method.

The invention, as will be seen, applies in all switching network configurations which are going to be described and in the numerous variants which can easily be derived therefrom.

It is also worth indicating that in all switching network configurations, it is generally desirable for reasons of standardisation and expandability, that the same type of switching element be used in all stages of the network. It can easily be verified that the switching element in FIGS. 1, 3 and 4 satisfies this requirement because it can easily be initialised with specific routing parameters, for example by stage, for each cell transfer sequence across the switching network.

FIG. 5 represents a unidirectional, symmetrical switching network RC1, consisting of switching elements such as that in FIG. 1, arranged in three stages comprising in the first stage switching elements TSi1 to TSiT, each with n inlets, in the central stage, switching elements Tso1 to TSoT each with n outlets. In this way, the switching network has $n = nT$ input ports connected to the inlets of the switching elements of the first stage and $n = nT$ output ports connected to the outlets of the switching elements of the last stage. The cell traffic is routed from the input ports to the output ports passing through all the switching elements in one direction; this is why the network is referred to as unidirectional. It is said to be symmetrical because the number of outlets is the same as the number of inlets. The T switching elements of the first stage have one or more (m) links to each of the k switching elements of the central stage, or mxk outlets. The T switching elements of the last stage have one or more (m) links from each of the central stage switching elements, or mxk inlets. The switching elements of the central stage therefore have Txm inlets and Txm outlets. Taking the figures previously quoted (FIG. 3, for example), the switching elements of the three stages can be 32 inlet and 32 outlet switching elements, with $Txm = kxm = 32$.

Since each of the switching elements of the central stage can reach all the switching elements of the last stage, a cell reaching the switching network at any inlet port, of switching element TSi1, for example, can be addressed to any of the central stage switching elements AS1 to ASk, whether the routing of this cell is point-to-point or point-to-multipoint. In such a network it can therefore be seen, according to the invention, that the outlets of the switching elements of the first stage are arranged in a single group of outlets and that a cell received by a switching element of the first stage, whether routing is point-to-point or point-to-multipoint, will be forwarded to a selected outlet from this single group of outlets. It is sufficient for this (see description relative to FIG. 4) that the routing control code translation memory (RCCTM) in these switching elements TSi1 to TSiT, provide the "distribution" mode signal DI in exchange for routing control code RCC information indicating that the cell is to be distributed to any outlet to the next stage, for point-to-point or point-to-multipoint routing.

In other words, position data included in the switching elements of the first stage (implicitly represented by the routing parameters in the routing control code translation memory) will enable the routing information of the cell to be interpreted in this way.

However, with respect to the central stage switching elements, each of them has only one or more (m) links to each switching element of the last stage. The routing depends on the identity of the destination outlet. A group of one or more (m) links is accessible for this purpose. Each switching element of the central stage will thus have T groups of one or (m) outlets. With different position data, these switching elements will interpret the same cell routing information, so as to select the appropriate routing group, in the case of a point-to-point routing, or the appropriate groups in the case of a point-to-multipoint routing, involving outlets of several different switching elements of the last stage. According to the embodiment in FIG. 4, the routing control code RCC considered above will be translated, in these switching elements of the central stage, into a "group" mode signal RS, for a point-to-point routing, or into an "MC" mode signal for point-to-multipoint routing, while the routing control address RCA, or the internal reference number IRN, will be used to identify the group or groups of outlets selected.

What applies for the switching elements of the central stage, relative to the routing situations in question, also applies for the switching elements of the last stage.

In the case where m=2, for example, the switching elements of the central stage have two links with each of the switching elements of the first and last stages. In this case, the switching elements of the central stage will have T groups of two outlets only one of which must be selected.

The number of switching elements of the central stage can, according to another variant, be greater than that of the switching elements of the two end stages, ceteris paribus. This will reduce the traffic load on the internal links of the switching network. Taking the previous example (m=2), the central stage could include 64 switching elements and, correlatively, the switching elements of the two m stages would have 128 outlets or inlets.

It can also be envisaged that, for a given capacity of the network in FIG. 5, in terms of number of switching elements per stage and number of link connections between them, certain input connections operating at a transmission speed greater than that practiced in the switching network could be coupled to several input ports over which the cells of this external connection are distributed; these are then transferred individually by the multiplicity of possible paths to the destination output ports. By generalising, this can enable a switching network to be constructed the switching and transmission speeds of which would be lower than those of the external transmission connections which it serves. Of course, what has just been said on the subject of input connections applies symmetrically to the output connections in which the cells of several output ports are multiplexed to the outgoing external connection.

The symmetrical unidirectional switching network in FIG. 6 comprises four stages. The denotations of the switching elements of the two end stages are the same as in FIG. 5. The switching elements of the two central stages are respectively denoted ASi1 to ASik and ASo1 to ASok.

The switching elements of the first two stages form an inlet selection unit USi, while the switching elements of the last two stages form an outlet selection unit USo. These two selection units are coupled by links joining the counterpart outlets and inlets.

Everything explained with respect to the network in FIG. 5 still applies here, considering that two counterpart switching elements of the two central stages form only one. However, from the control point of view, the switching elements ASi1 to ASik will advantageously be constructed to effect a distribution, whether the routing mode be point-to-point or point-to-multipoint. The switching elements ASo1 to ASok, from the control point of view, will be treated in the same way as switching elements AS1 to ASk in FIG. 5.

The switching network in FIG. 7 is similar to that in FIG. 6, but folded, therefore bidirectional, merging the switching elements of the end stages TSi1 to TSiT and TSo1 to TSoT into switching elements of the first stage TS1 to TST, while the denotation of the switching elements of the second stage in FIG. 5, AS1 to ASk is retained for the switching elements of the second stage in FIG. 7.

The inlets of the switching elements of the first stage are shared between the input ports and the output ports of the switching network (in equal parts for networks with no expansion/concentration function). The internal links are duplicated, comprising one or more connections for each routing direction. The switching elements are bidirectional and perform the reflection function, either in the first stage or in the second stage.

In the routing of a cell from an inlet of switching element TS1 to one or more outlets of another switching element TST, whether in the context of point-to-point or point-to-multipoint routing, switching element TS1 performs a distribution to all the switching elements of the next stage, while the switching element of the second stage which routes the cell applies the "group" or "multicast" routing mode and the same applies with respect to the switching element TST. In the case of transferring a cell from an inlet of switching element TS1 to one or more outlets of the same switching element TS1, a transfer reflection function can be operated directly in the first stage, that is in the bidirectional switching element TS1 which directly transfers the cell to the destination outlet or outlets, instead of transferring it normally for distribution to the next stage.

Everything which has been said concerning the network in FIG. 5 therefore also applies to the network in FIG. 7, making the necessary conversions, taking into account the superimposition of the two routing directions of the traffic in the switching elements of these two stages and execution of a reflection function in the switching elements of the first or second stage.

Referring to FIG. 3, the switching elements of the first stage comprise 16 inlets and 16 outlets connected respectively to input ports and to output ports. They also comprise 16 inlets and 16 outlets connected to 16/m switching elements of the second stage, where m is the number of internal links between two switching elements belonging respectively to each of these two stages. If the first stage comprises 16 switching elements (m=1), 16 inlets and 16 outlets of the switching elements of the second stage are respectively connected to the 16 switching elements of the first stage by 16 bidirectional links each comprising a single connection in each routing direction. The traffic from these 16 inlets is then reflected to the 16 outlets. The other 16 inlets and outlets of the switching elements of the second stage are not used and are available for extending the network by adding a third stage. If the first stage comprises up to 32 switching elements, the 32 inlets and 32 outlets of the switching elements of the second stage provide the 32 two-connection links, one in each routing direction, which are necessary to reach them.

The operating mode of the switching elements in processing the two routing directions has already been explained with reference to FIGS. 3 and 4.

Referring now to FIG. 8 which represents a switching network derived from that in FIG. 5, but here obtained by juxtaposing two separate but counterpart unidirectional switching networks stage by stage, each allowing the transfer in a given direction, from N1 inlets on one side to N2 outlets on the other side, or N2 inlets on this latter side to N1 outlets on the former side. In fact, such a switching network can typically be used to form an asymmetric assembly interconnecting N1 bidirectional connections on one side to N2 bidirectional connections on the other side, where N1 is greater than N2. The unidirectional network of N1 to N2 therefore implements a traffic concentration function and the other unidirectional network from N2 to N1 a traffic expansion function. Each of these unidirectional networks therefore differs from that in FIG. 1 only in the fact that it is asymmetric because of the presence of at least one stage of asymmetric switching elements, that is switching elements in which the number of inlets and outlets differs, for example 32×16 or 16×32. Apart from this configuration variant, the routing principles described for each stage of the network in FIG. 5 are still applicable to the corresponding stages in each of these two asymmetric unidirectional networks.

FIG. 9 represents an equivalent of the switching network in FIG. 8, in a bidirectional configuration. In this case the asymmetric switching network interconnects the N1 input and output ports on one side to the N2 input and output ports on the other side. Assuming N1 is greater than N2, such a network is applied typically to the concentration of N1 relatively low traffic connections to N2 higher traffic connections. Cell transfers can therefore be performed between these two sets of ports N1 and N2, either unidirectionally, from an input port of the set N1 (or N2) to an output of the set N2 (or N1), or bidirectionally between an input and output port of assembly N1 and an input and output port of assembly N2. In addition, the presence of at least one bidirectional stage also enables cells to be transferred between an input port and an output port of the same set N1 (or N2), performing a reflection function in a bidirectional stage. From the configuration point of view, the capacity of this network is similar to that of FIG. 8; as in FIG. 8, at least one of the stages is asymmetric, so that the switching network presents different numbers of input and output ports N1 and N2 on either side of the switching network.

The different transfer sequences are applied as follows:

- For an unreflected cell transfer between an input port on one side of the network (set N1 or N2) and an output port on the other side of the network (set N2 or N1), the first stage distributes the incoming traffic over all the switching elements of the intermediate stage. Then, the intermediate stage forms a selective routing to the last stage by transferring the cell to one or more groups of outlets leading to one or more switching elements of the last stage. In the last stage, a selective routing enables the cell to be transferred to the destination output port or ports.

- For a reflected transfer, between an input port and an output port of the same set N1 or N2, the reflection function can be implemented in the switching element of the first stage if the ports are connected to the same switching element and if it is bidirectional. Otherwise, the switching element of the first stage distributes the cell to any one of the switching elements of the intermediate stage, which will advantageously be bidirectional to enable this type of reflected transfer by selective routing to be performed to the switching element or switching elements of the first stage. In the first stage, a selective routing enables the cell to be transferred to the destination output port or ports.

FIG. 10 represents a possible extension of the switching network in FIG. 9 by adding an additional selection stage. In addition, the first two switching element stages, on the side of the N1 input and output ports, consist of m two stage bidirectional routing selection units, each similar, apart from their capacity, to the network in FIG. 7, the switching elements also being denoted by the same references as in FIG. 7.

Apart from the addition of a fourth stage in the organisation of the first two stages on the side of the set of N1 ports, the types of transfer possible in such an asymmetric bidirectional switching network can easily be extrapolated from that in FIG. 9:

- An unreflected cell transfer between an input port of set N1 and an output port of set N2 is performed by distribution from the first stage to any of the switching elements in the second stage of the selection unit, then this selection unit performs a distribution to any switching element in the third stage. In the third stage, the switching element performs a selective routing to one or more switching elements of the fourth stage, the fourth stage performing a selective routing to one or more output ports of set N2.

- For an unreflected cell transfer in the other direction, from set N2 to set N1, the first stage distributes each cell to one of the switching elements of the next stage. In this transfer direction, this next stage performs a selective routing to one or more of the m two stage selection units, at the same time freely selecting one of the switching elements of the first stage in each destination selection unit. In a switching element of the third stage, a selective routing transfers the cell to one or more switching elements of the fourth stage, the fourth stage performing a selective routing to one or more output ports of set N1.

- For a reflected transfer between an input and an output port of the same set N2 or the same subset N'1 of a selection unit, the reflection function occurs either in the first, or in the second stage as in the network in FIG. 9.

- On the other hand, for a reflected transfer between an input port and an output port of the same set N1, but of two different selection units, the reflection function is possible only in the third stage which interconnects the m selection units. In this case, the first stage performs a distribution to the switching elements of the second stage; the second stage also performs a distribution to the switching elements of the third stage; the third stage then reflects the transfer and performs a selective routing to one or more destination selection units, at the same time leaving a free choice between the switching elements of the second stage in each selection unit concerned. Then, the switching element of the second stage performs a selective routing to one or more switching elements of the first stage, the first stage performing a selective routing to one or more destination output ports of the set N'1.

This example of a switching network illustrates once again the fact that, according to the invention, the groups of outlets constructed in the switching elements of the switching network are not the same according to the stage into which they belong and account is taken of this in the routing mode implemented in each stage although the routing information of the cell remains the same in all stages.

Turning now to FIG. 11 which represents a unidirectional switching network composed of selection units which comprise input terminal units TSUi, selection planes PS and output terminal units TSUo, in each selection unit, there are switching elements which can be of the type in the previous figures, each represented by the customary sign of a switching matrix, with, on the left, the number of inlets of the switching element and, on the right, the number of outlets of the switching element. These switching elements are interconnected by links.

Within an input terminal unit TSUi1, for example, there are two stages of switching elements, switching elements TSi1 to TSi16 and switching elements ASi1 to ASi4. There are in general one or more links between an outlet of a switching element of the first stage and an inlet of a switching element of the second stage. The four outlets of a switching element of the first stage, TSi1 for example, are then each connected to one or more inlets of each of the four switching elements of the second stage. In the case of a single link, the 16 inlets on a switching element of the second stage, ASi1 for example, are each connected to an outlet of each of the 16 switching elements of the first stage. The $16 \times 4$ inlets of the switching elements of the first stage are connected to 64 input ports pi1 to pi64. The other input terminal units can be similar, except for the numeric values indicated. In this example, the output terminal units are assumed to be constructed in the same way and symmetrically. Thus the output terminal unit TSUo1, for example, gives access, via the two stages of switching elements comprising the switching elements ASo1 to ASo4 and TSo1 to TSo16, to output ports po1 to po64.

The figure also represents input and output terminal units TSUi128 and TSUo128, to indicate a total number of terminal units in the switching network.

The selection planes, such as the selection plane PS1, comprise three selection stages formed from PSi1 to PSi32, PSc1 to PSc16, PSo1 to PSo32. The arrangement of internal links between one stage and the next obeys the same principle as the terminal selection unit, assuming in this example a number of links between switching elements equal to 1; this will not be described in detail.

There are 16 selection planes PS1 to PS16. The 16 outlets of a switching element of the second stage of an input terminal selection unit TSUi1 for example, are individually connected by 16 links to an inlet of each of the 16 selection planes. The four outlets of the same rank of the four switching elements of an input terminal unit, TSUi1 for example, are connected to successive inlets of the same switching element, PSi1 for example, of a selection plane, PS1 in this instance. Therefore, the 512 inlets of a selection plane, PS1 for example, are connected, in fours, to the four switching elements of the second stage of each of the 128 input terminal units.

The construction of the links between the outlets of the switching elements of the first stage of the selection planes, PSo1 to PSo32 for the selection plane PS1 for example, and the inlets of the switching elements of the first stage of the output terminal units is symmetrical with that which has just been described.

When the entire switching network is symmetrical with respect to the central stage of the selection planes, that is when the number of switching element inlets and outlets and the number of counterpart links are identical, it is possible to construct an equivalent folded switching network, with bidirectional switching elements at least for part of the stages, as represented in FIG. 12 and described below. Each central switching element, such as PSc1, is linked by three switching stages on each side to all the input ports and all the output ports. Conversely, between any input port and any output port, there are in this example more than 4 000 (4 k) separate paths passing through one of the four switching elements ASi of the incoming selection unit, one of the 16 selection planes PS, one of the 16 central switching elements PSc in a plane, and one of the four switching elements AS0 of the outgoing selection unit. Taking into account the total accessibility of each input port to all the central switching elements PSc of all the planes, the transfer in this first part of the network effects a general distribution of all the incoming traffic over all $16 \times 16$ central switching elements PSc, therefore a complete distribution of all the incoming cell traffic.

Then, from the central stage PSc to the output ports, routing is necessarily selective, to reach the destination output port or ports. If it is desired to reach several separate output ports, in a point-to-multipoint routing, this selective routing must comprise a number of branches with one or more stages.

Referring now to the previous descriptions, with particular respect to FIGS. 1 and 3, a description follows of how the different routing modes are applied in the switching elements of the network in FIG. 11.

Consider first of all a point-to-point routing, for example between the input port pi1 and the output port po1. In the cell header, routing mode data in the routing control code RCC specifies point-to-point routing. The output address RCA comprises seven bits denoting the terminal unit TSUo1 and six bits denoting the output port po1 in the terminal unit.

In the switching elements of the first stage of the switching network, such as TSi1, the routing parameters are such that the cell is forwarded to one of the set of all the outlets of the switching element. The conditions of this selection have already been examined. For example, the cell is thus forwarded to switching element ASi1.

In the switching elements of the second stage of the switching network, such as ASi1, the routing parameters have the same effect as in the first stage and the cell is thus forwarded to one of the set of all the outlets of the switching element, for example that which leads to the plane PS1 and therefore, in PS1, to the switching element PSi1.

The same applies in the switching elements of the third stage of the switching network and the cell reaches for example switching element PS1.

From the central stage, routing becomes selective, at least in part.

The routing parameters of the switching elements of the central stage of the switching network are such that the switching element PSc1 selects a group of four terminal units in which the destination terminal unit is located, on the basis of five bits, out of the seven bits denoting the terminal selection unit, which denote the routing group, in the present example a single outlet, leading to that of the 32 switching elements of the fourth stage of the switching network which, in plane PS1, access the destination terminal unit. In this way a link is selected leading to the switching element PSo1.

The operating mode is similar to that which has just been examined in the switching elements of the fifth stage of the switching network. The routing parameters are different; they lead to the selection of the two remaining bits of the identity of the destination terminal unit, which identify a routing group comprising the four outlets leading to the four switching elements ASo1 to ASo4, according to the example in question. One of these four outlets is selected as described previously. It leads the cell, for example, to switching element ASo1.

In the switching elements of the sixth stage of the switching network, the routing parameters select, from the six bits of the address RCA denoting the output port, the four bits identifying the switching element of the last stage serving this output port. The cell is thus led to the switching element TSo1, in accordance with the example selected.

Finally, in a similar manner, in the switching element of the last stage of the switching network, the routing parameters will enable the cell to be transferred to output port PO1.

During this point-to-point transfer sequence, the routing parameters of the switching elements of the different stages have therefore first of all enabled the cell to be transferred non-selectively to any switching element of the central stage, then transferred selectively, using successive parts of the output address RCA, to the destination indicated.

It is easy to verify that, insofar as all the switching elements of the central stage, in a selection plane, see the 32 switching elements of the fifth stage of this selection plane in the same way, the routing is identical in each of them. Similarly, insofar as all the selection planes see the output terminal units in the same way, it can be concluded that all the switching elements of the central stage perform the routing in the same way. Similar reasoning leads to the same conclusion with respect to the switching elements of the other stages, from the fifth to the last. The conclusion is, in such an example of a folded switching network, that the routing parameters depend only on the identity of the stage in which the switching element is located, not on its position in the stage.

However, it could also depend on the position of the switching element in the stage, in certain variants of this type of switching network, for example such that the set of terminal units of the set of selection planes does not consist of selection units of identical configuration, as is the case, for example, during switching network extension operations requiring progressive changeover from one configuration to another.

In addition, it should be emphasised that successive cells, from the same source and with the same destination can, mainly through the distribution routing practiced in the first stages of the switching network, take a large number of different paths, which implements a distribution of regular and irregular traffic streams, favourable to the more even handling of the varied cell throughputs submitted to the switching network and therefore the relative performance of the cell transfer function.

Point-to-multipoint routing, in such a network, is performed on the same basis, except that in some or all selective routing stages, the cell is replicated and forwarded to different groups of outlets in the switching elements of the stage in which the multicast tree indicates that several outgoing branches are required to the next stage.

This example illustrates how point-to-multipoint transfers according to predetermined multicast trees can be implemented according to the invention in multiple path, self-routing networks, retaining for this type of transfer the possibility of choosing a path from any one to several ports from the multiplicity of possible paths across the switching network, through a characteristic organisation of the content of the multicast tree memories of the switching elements of the different stages. According to the invention, it is possible to define corresponding branch points such that no unnecessary copy is generated in any stage, which avoids any internal overloading of the internal links between stages. This characteristic is implemented according to the following principles:

- the absence of copy in the distribution stages;
- the same content (branch points) of the multicast tree memory in all the switching elements of a stage which belong to a particular set of equivalent multiple paths for routing the cells to the groups of switching elements of the next stage;
- in these "equivalent" switching elements which perform a selective routing over different and separate routing groups, a branch to several predetermined routing groups (in the multicast tree memory) is performed by transferring a copy of the incoming cell only to the routing groups marked as branches required in the switching elements out of the set of possible routing groups. Thus, no unnecessary copy is generated in each stage.

FIG. 12 represents the folded version of the network in FIG. 11, obtained using at least for one part stages of bidirectional switching elements, other than for the central stage PSc which remains unidirectional. By analogy with the notation used, it is clear that the counterpart switching elements can now be merged in bidirectional stages, as follows:

- the previous stages 1 and 7 (TSi and TSo) become the first bidirectional stage (TS),
- the previous stages 2 and 6 (ASi and ASo) become the second bidirectional stage (AS),
- the previous stages 3 and 5 (PSi1 and PSo1) become the third bidirectional stage (PSa).

However, the central stage PSc remains unidirectional and this fourth stage is referred to as the mirror stage (mandatory reflection).

The set of characteristics and properties of the unidirectional network in FIG. 11 can easily be transferred to that of the folded version:

- The same number of possible paths exists without counting the additional paths rendered possible by the intermediate reflection functions described below.
- The two major processes in the transfer of a cell, general distribution and selective routing, are also implemented by referring now to a first transfer part in the incoming direction up to the reflection stage and a second transfer part in the outgoing direction from the latter up to the first stage, the routing operations at each stage easily being transposed by symmetry and being based on the same principles as those described for the network in FIG. 11.

However, the folded variant in FIG. 12 presents the following additional characteristics derived from the intrinsic reflection facilities possible in a bidirectional switching element as described previously:

- In the first part of a point-to-point transfer in which the cell is freely distributed in the incoming direction to one of the switching elements of the next stage, in each bidirectional stage, potentially TS, AS and PSa, a premature reflection is possible whenever the destination output port is accessible by the switching element in question, and of course if the latter is bidirectional. Such a premature reflection is therefore possible:
  - in the first stage TS if the destination port belongs to the group of ports connected to the switching element in question TSx,
  - in the second stage AS if the destination ports belongs to the terminal unit in which the switching element in question ASx is located,
  - in the third stage PSa if the destination port belongs to the group of four terminal units to which the switching element in question TSax is connected.
- Said premature reflection possibilities induce the following characteristic properties:
  - a relative reduction of the load on the internal links insofar as part of the cell traffic does not pass through all the stages of the switching network,
  - an increase in the number of possible paths, that is the prematurely reflected paths,
  - the possibility of underequipping the switching network in the figure in terms of the number of stages and to proceed with successive extensions of stages without altering the wiring between stages, insofar as each bidirectional stage 1, 2 or 3 can temporarily form the last equipped stage and then perform the mandatory reflection functions of a mirror stage.

While the principles of the invention have been described above in connection with specific apparatus and particular numerical figures, it is to be clearly understood that description is made only by way of example and not as a limitation on the scope of the invention.

I claim:

1. Cell-based multiple path, self-routing switching network for switching asynchronous time division multiplex cells of fixed or variable length, said switching network comprising:
   a plurality of input ports;
   a plurality of output ports;
   a plurality of switching elements arranged in several stages of interconnected switching elements,
   wherein
   each of said switching elements has inlets and outlets arranged to transfer a cell received on one of its inlets to one or more of its outlets according to routing information associated with said cell,
   the input ports are coupled to respective said inlets of the switching elements of an input stage,
   the output ports are coupled to respective said outlets of the switching elements of an output stage,
   each switching element of at least one stage of the network has at least three said outlets,
   said at least three outlets are arranged in at least two predetermined groups of said outlets,
   at least one group of said predetermined groups of outlets comprises at least two said outlets, and
   said each switching element further comprises
   means for identifying, on the basis of routing information data associated with a cell received at any one of its inlets, a set comprising one or more of said predetermined group of said outlets, and
   means for transferring said received cell to a respective selected outlet of each of said one or more of said outlet groups of the thus identified set.

2. Switching network according to claim 1, wherein each of the switching elements of a stage other than said at least one stage has at least three outlets arranged in at least one predetermined group of outlets in an arrangement different from that of the outlets of said at least one stage into said at least two predetermined groups of outlets, and
   said each of the switching elements of said at least one stage and of said other stage further comprises
   means for holding its own routing parameters derived from position information depending on the stage in which said each switching element is located, and
   means for using said own routing parameters to determine the arrangement of its own respective outlets in its own respective predetermined routing group or predetermined routing groups.

3. Switching network according to claim 2 wherein said position information also depends on the location of said each switching element in its respective said stage.

4. Switching network according to claim 2, wherein said each stage further comprises means for interpreting said own routing parameters to determine whether a received cell is to be transferred to the outlets of the switching element in a point-to-point routing mode or a point-to-multipoint mode, and
   said interpretation is based on said routing parameters.

5. Switching network according to claim 1, wherein the switching elements of at least certain stages of the network includes means for interpreting routing information contained in a routing tag of a cell, and
   said routing information include a routing control code defining the required sequence for transferring the cell across the switching network, an output port address, for a point-to-point routing, and/or a multicast tree internal reference number for a point-to-multipoint routing.

6. Switching network according to claim 5, wherein said switching elements interpreting said routing control code on the basis of said routing parameters implement as a result of thereof a point-to-point routing mode or a point-to-multipoint routing mode.

7. Switching network according to claim 1, wherein the switching elements of at least one stage are asymmetric, each implementing an expansion of the traffic entering the stage thereby reducing the cell traffic load of the outlets of these switching elements with respect to their inlets.

8. Switching network according to claim 1, wherein the switching elements of at least one stage are asymmetric, each implementing a concentration of traffic leaving the stage, thereby increasing the cell traffic load of the outlets of these switching elements with respect to their inlets.

9. Switching network according to claim 1, wherein the switching elements of at least a first stage are asymmetric, each implementing an expansion of the traffic entering the stage, reducing the cell traffic load of the outlets of these switching elements with respect to their inlets, and
   thereby achieving a reduction in the traffic load within the switching network between these two types of switching stages of asymmetric switching elements.

10. Switching network according to claim 9, wherein the expansion rate in at least one of the first stages is exactly compensated for by the concentration rate in at least one of the last stages, thereby implementing a symmetrical switching network having the same number of input and output ports.

11. Switching network according to claim 1, wherein
all the switching stages are asymmetrical, having the same number of inlets and outlets, and
the switching network is therefore also asymmetrical, having the same number of input ports and output ports.

12. Switching network according to claim 5, wherein
at least certain stages are bidirectional switching stages for routing cells belonging to two opposing traffic streams,
in each of the switching elements of each of the bidirectional switching stages, the inlets are divided into two sets of inlets and the outlets into two sets of outlets, one traffic stream normally being routed from a first set of inlets to a first set of outlets and the other traffic stream from a second set of inlets to a second set of outlets, and
the interpretation of the routing information in the switching element of a bidirectional switching stage takes account of the traffic stream to which it relates.

13. Switching network according to claim 4, wherein all the stages of the switching network are unidirectional, routing cells belonging to a single traffic stream routed.

14. Switching network according to claim 13, wherein
said network includes at least three said stages,
each switching element of a stage other than the last is connected by one or more links to each switching element of a following stage, and
each switching element of one stage other than the first is connected by one or more links to each switching element of a preceding stage.

15. Switching network according to claim 13, wherein
said network further comprises at least two selection units including at least one inlet selection unit and at least one outlet selection unit,
each said selection unit is formed of selection unit switching elements arranged in at least two selection unit stages,
each selection switching element of a selection unit stage other than the last is connected by one or more links to each selection unit switching element of the following selection unit stage,
each selection unit switching element of a selection unit stage other than the first is connected by one or more links to each selection unit switching element of a preceding selection unit stage,
the inlet selection units are disposed in tandem with the outlet selection units,
the input ports are connected to the inlets of the inlet selection units, and
the output ports are connected to the outlets of the outlet selection units.

16. Switching network according to claim 15, further comprising selection plane selection units for connecting inlet selection unit outlets to outlet selection unit inlets.

17. Switching network according to claim 13 wherein, in the unidirectional switching elements of at least one stage, one of said groups of outlets contains all of the outlets, for a general distribution of the incoming traffic over all the outlets of this stage in the incoming transfer direction.

18. Switching network according to claim 12, wherein
said switching network is configured as an extensible folded network having at least two stages,
the first stage is a bidirectional stage which functions as said input stage and also as said output stage,
the input ports are connected to the inlets of said first set of inlets of the switching elements of the first stage,
the output ports are connected to the outlets of said second set of outlets of these same switching elements of the first stage, and
the last stage is a unidirectional switching stage which routes an incoming traffic stream to the switching elements of a preceding stage, thereby implementing a traffic reflection function.

19. Switching network according to claim 12, wherein said switching network is configured as an extensible folded
network having at least three stages at least one of which is bidirectional,
the first stage functions as said input stage and also as said output stage and consists of two sets of counterpart unidirectional switching elements, one incoming, the other outgoing,
the input ports are connected to the inlets of said set of unidirectional incoming switching elements of the first stage,
the output ports are connected to the outlets of said set of unidirectional outgoing switching elements of the same first stage, and
the last stage comprises unidirectional switching elements which route an incoming traffic stream to the switching elements of a preceding stage, thereby implementing a reflection function.

20. Switching network according to claim 18, wherein
each switching element of a stage other than the last stage is connected by one or more links to each switching element of a following stage, and
each switching element of a stage other than the first stage is connected by one or more links to each switching element of a preceding stage.

21. Switching network according to claim 12, wherein
said switching network is configured as an extensible folded network having at least four stages, at least one of which is bidirectional,
at least the first two stages of the switching network comprise inlet and outlet selection units each formed from switching elements arranged in at least two selection unit stages,
each said switching element of one selection unit stage other than the last is connected by one or more links to each switching element of a following selection unit stage,
each said switching element of one selection unit stage other than the first is connected by one or more links to each switching element of a preceding selection unit stage, and
the last stage of the switching network is a unidirectional switching stage which routes an incoming traffic stream to the switching elements of a preceding stage, thereby implementing a reflection function.

22. Switching network according to claim 21, wherein the inlet and outlet selection units are interconnected by at least two selection planes, each comprising an arrangement of one or more stages according to the required capacity of the switching network.

23. Switching network according to claim 22, wherein the increase in capacity of said extensible network is achieved by adding successive stages without altering the wiring between stages, each intermediate configuration of fewer stages using as its last installed stage a stage of bidirectional switching elements which can implement a reflection function in the last stage of the folded network.

24. Switching network according to claim 12, wherein said switching network is configured as an extensible folded network having at least three stages at least one of which is bidirectional, the input ports are connected to inlets of the switching elements of a first stage which functions as said input stage, the output ports are connected to outlets of the switching elements of the same first stage which also functions as said output stage, the last stage comprises unidirectional switching elements which route an incoming traffic stream to the switching elements of a preceding stage, thereby implementing a reflection function, and the switching elements of one or more of the first stages of the switching network are arranged so that, in the incoming traffic routing direction and when the routing data specifies a point-to-point routing and/or a point-to-multipoint routing, and taking into account said routing parameters, there is a general distribution of the incoming traffic.

25. Switching network according to claim 1, wherein, in said each switching element, any cell to be transferred from one of the outlets of a selected said routing group of outlets is provided at a selected outlet of said selected routing group.

26. Switching network according to claim 25, wherein the cell load is balanced over all the outlets of said routing group.

27. Switching network according to claim 25, wherein a quasi or pseudo-random distribution process is used to select the selected outlet in order to achieve a decorrelation between the distribution of cells over the inlets and the distribution of cells over the outlets of said each switching element.

28. Switching network according to claim 13, wherein said switching network further comprises two asymmetric unidirectional networks each having a respective three counterpart stages, the first unidirectional network interconnecting N1 input ports to N2 output ports, the second unidirectional network connecting N2 input ports to N1 output ports, juxtaposed so as to achieve the equivalent of a switching network interconnecting in both traffic directions, on one side N1 input and output ports and on the other, N2 output and input ports.

29. Switching network according to claim 12, wherein the switching network comprises at least three said stages at least one of which is bidirectional, said at least three stages are arranged to form a non-folded bidirectional network interconnecting a first set of N1 input and output ports and a second set of N2 output and input ports, each switching element of an internal stage is connected to the switching elements of the preceding and following stages by one or more links, each switching element of an end stage is connected on one side to the switching elements of the adjacent stage and, on the other, to one of the sets of input and output ports, and the cells are transferred between an input port and an output port belonging either to the two different sets of ports, through transfer across the three stages, or to the same set of ports through reflected transfer in one of the switching elements of a bidirectional stage, permitting the interconnection of these two ports.

30. Switching network according to claim 29, wherein it contains at least four stages, wherein at least the first two stages, adjacent the set of N1 input and output ports, consists of inlet and outlet selection units each formed from switching elements arranged in at least two stages, at least one stage, adjacent the set of N2 input and output ports interconnects firstly, this set of N2 ports and, secondly the selection units giving access to said N1 ports, and the switching elements of successive stages are interconnected by one or more links.

31. Switching network according to claim 22, wherein the number of said selection planes is selected on the basis of the highest cell traffic load averaged over the set of input and output ports of each selection unit, the use in the calculation exclusively of these average values being made possible by the distribution of traffic over a multiplicity of paths in each selection unit.

32. Switching network according to claim 6, wherein said switching elements of said at least one stage each further an associated branch point memory, and the identities of the outlet groups corresponding to the branches to be performed in a switching element, when it is to operate in a point-to-multipoint routing mode are obtained by reading the associated branch point memory using said multicast tree internal reference number.

33. Switching network according to claim 32, wherein the contents of the branch point memories of the switching elements of the different stages are marked so that only those of the switching elements effecting a selective routing contain branching indications necessary for the stage in question for the multicast tree in question, no branching indication is marked in the switching elements of the stages effecting a general traffic distribution, and the different switching elements which belong to a set of equivalent switching elements in respect of the internal paths between stages, possess the same branch point content for each multicast tree, thereby avoiding the generation of unwanted copies of cells in the switching network.

34. Switching network according to claim 32, wherein said distribution tree does not depend on the input port but only on the set of output ports to which a cell from any input port is to be transferred.

35. Switching network according to claim 1, wherein at least some of the switching elements are switching modules each of which is composed of several elemental switching elements arranged so that said switching module presents at its input and output access points the characteristics and performances of a single virtual switching element having a greater number of inlets and outlets than a single said elemental switching element.

36. Switching network according to claim 1, wherein said cells are packets.

37. Switching network according to claim 1, wherein said cells are cells of fixed or variable length consisting of a number of fixed length subcells.

38. Switching network according to claim 1, wherein said routing information associated with the cell is contained in the cell itself.

39. Switching network according to claim 2, wherein the arrangement of said outlets in said groups is different in said at least two stages.

40. Switching network according to claim 2, wherein the arrangement of said outlets in said groups is the same in said at least two stages.

41. Switching network according to claim 2, wherein said position information is independent of the location of said each switching element in its respective said stage.

42. Switching network according to claim 12, wherein, in the switching elements of at least one bidirectional stage, one of said groups of outlets contains all the outlets of one of the two sets of outlets for one of the two transfer directions, for a general distribution of the incoming traffic over all the outlets of this stage in the incoming transfer direction.

43. Switching network according to claim 1, wherein said set of groups includes at least two of said groups.

* * * * *